United States Patent [19]
Woodgate et al.

[11] Patent Number: 5,917,562
[45] Date of Patent: Jun. 29, 1999

[54] AUTOSTEREOSCOPIC DISPLAY AND SPATIAL LIGHT MODULATOR

[75] Inventors: Graham John Woodgate, Oxfordshire; Jonathan Harrold, Oxford; David Ezra; Basil Arthur Omar, both of Oxfordshire; Edward Peter Raynes, Oxford, all of United Kingdom

[73] Assignee: Sharp Kabushiki Kaisha, Osaka, Japan

[21] Appl. No.: 08/573,155

[22] Filed: Dec. 15, 1995

[30] Foreign Application Priority Data

Dec. 16, 1994 [GB] United Kingdom .................. 9425607
Oct. 13, 1995 [GB] United Kingdom .................. 9521054

[51] Int. Cl.$^6$ .................. G02F 1/1335; G02F 1/136; G02B 27/22; G02B 27/26
[52] U.S. Cl. .................. 349/15; 349/46; 349/96; 349/98; 359/462; 359/465
[58] Field of Search .................. ; 358/88, 89, 90, 358/91, 92; 348/51, 57, 58, 59, 60; 349/15, 96, 98; 359/462, 464, 465; H04N 13/00, 13/04, 15/00

[56] References Cited

U.S. PATENT DOCUMENTS

| 2,203,687 | 6/1940 | Land et al. . | |
| 2,574,186 | 11/1951 | Mohler . | |
| 3,858,001 | 12/1974 | Bonne | 348/57 |
| 5,264,964 | 11/1993 | Faris | 359/465 |
| 5,327,285 | 7/1994 | Faris | 359/483 |
| 5,410,345 | 4/1995 | Eichenlaub | 348/59 |
| 5,537,144 | 7/1996 | Faris | 348/58 |

FOREIGN PATENT DOCUMENTS

| 332268 | 9/1989 | European Pat. Off. . | |
| 477882 | 4/1992 | European Pat. Off. . | |
| 0541374 | 5/1993 | European Pat. Off. . | |
| 0653891 | 5/1995 | European Pat. Off. . | |
| 63-158525 | 7/1988 | Japan . | |
| 63-220226 | 9/1988 | Japan . | |
| 63-274921 | 11/1988 | Japan . | |
| 6-078432 | 3/1994 | Japan | H04N 13/04 |
| 2155193 | 9/1985 | United Kingdom . | |
| 2231754 | 11/1990 | United Kingdom . | |
| WO 85/02914 | 7/1985 | WIPO . | |
| WO 94/06249 | 3/1994 | WIPO | H04N 13/04 |

OTHER PUBLICATIONS

Land, J.O.S.A. Jun. 1940, vol. 30, pp. 230–238, "Vectographs: Images in Terms of Vectorial Inequality and Their Application in 3–Dimensional . . . ".
Faris, Advanced Imaging, pp. 18–22, May 1992, vol. 7, No. 5, "True Stereo Display and Hard Copy from One System."
Chigrinov et al, SPIE vol. 2407/185, "Photoanisotropic Films: Physics and Application in LCDs."
Yamada et al, SID 95 Digest. pp. 575–578, "Late News Poster: Axially Symmetric Aligned Microcell (ASM) Mode: Electro–Optical Characteristics . . . ".
Free, "3–D TV", Popular Science, pp. 58–62 and 110, Jun. 1988.

Primary Examiner—William L. Sikes
Assistant Examiner—Toan Ton

[57] ABSTRACT

An autostereoscopic display of the invention includes: an illumination source for producing light of a first polarization and light of a second polarization different from the first polarization; a spatial light modulator for modulating the light of the first polarization and the light of the second polarization from the illumination source; and an optical system for directing the light of the first polarization to a first viewing region and the light of the second polarization to a second viewing region, wherein the spatial light modulator includes: a first polarization adjusting member for transmitting the light of the first polarization and substantially preventing transmission of the light of the second polarization; a second polarization adjusting member for transmitting the light of the second polarization and substantially preventing transmission of the light of the first polarization; and first and second groups of picture elements optically aligned with the first and second polarization adjusting member, respectively.

51 Claims, 25 Drawing Sheets

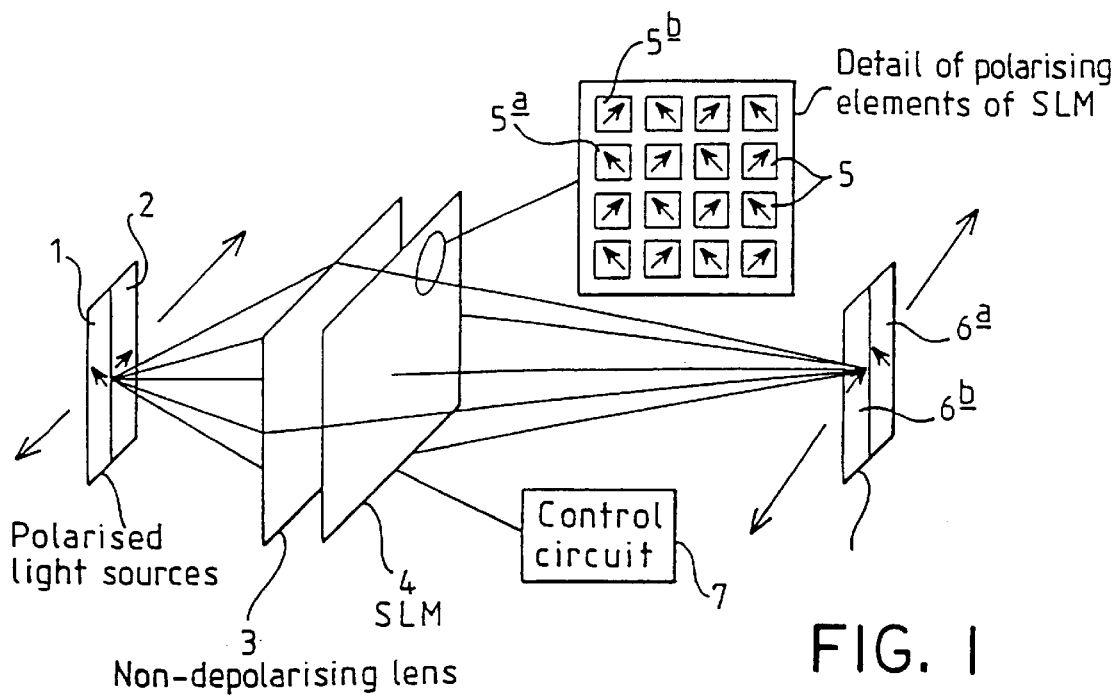
FIG. 1
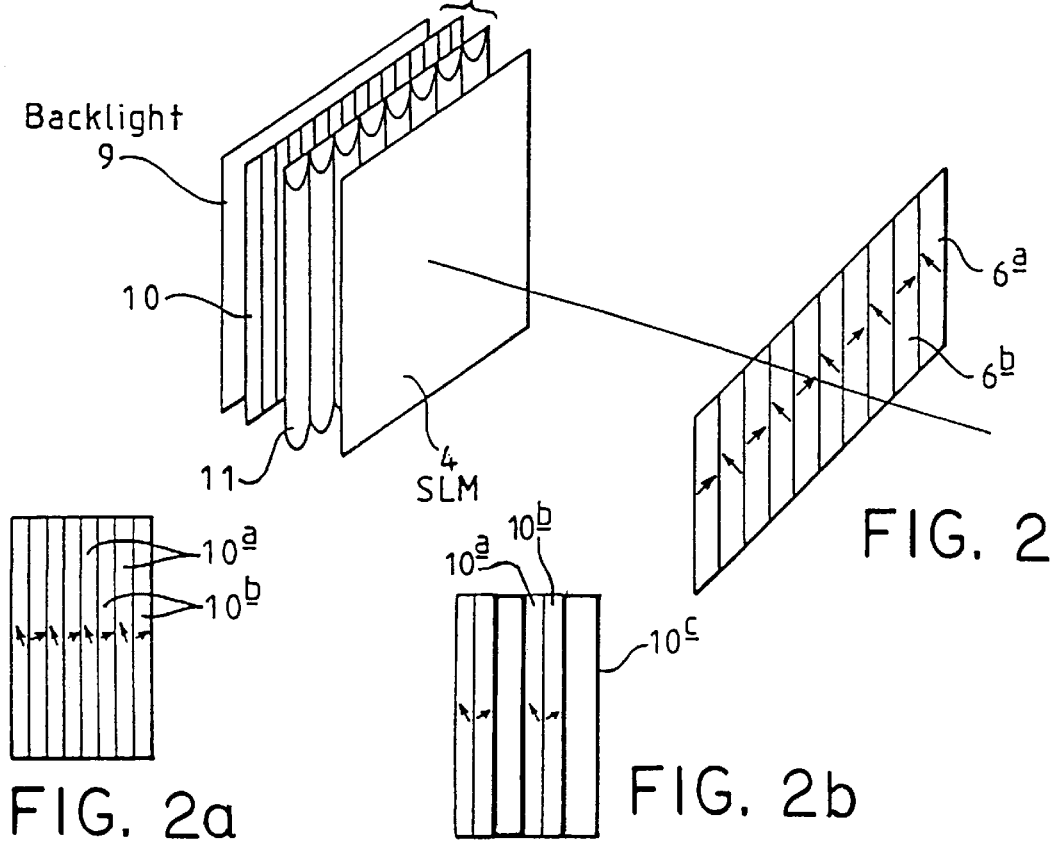
FIG. 2
FIG. 2a
FIG. 2b

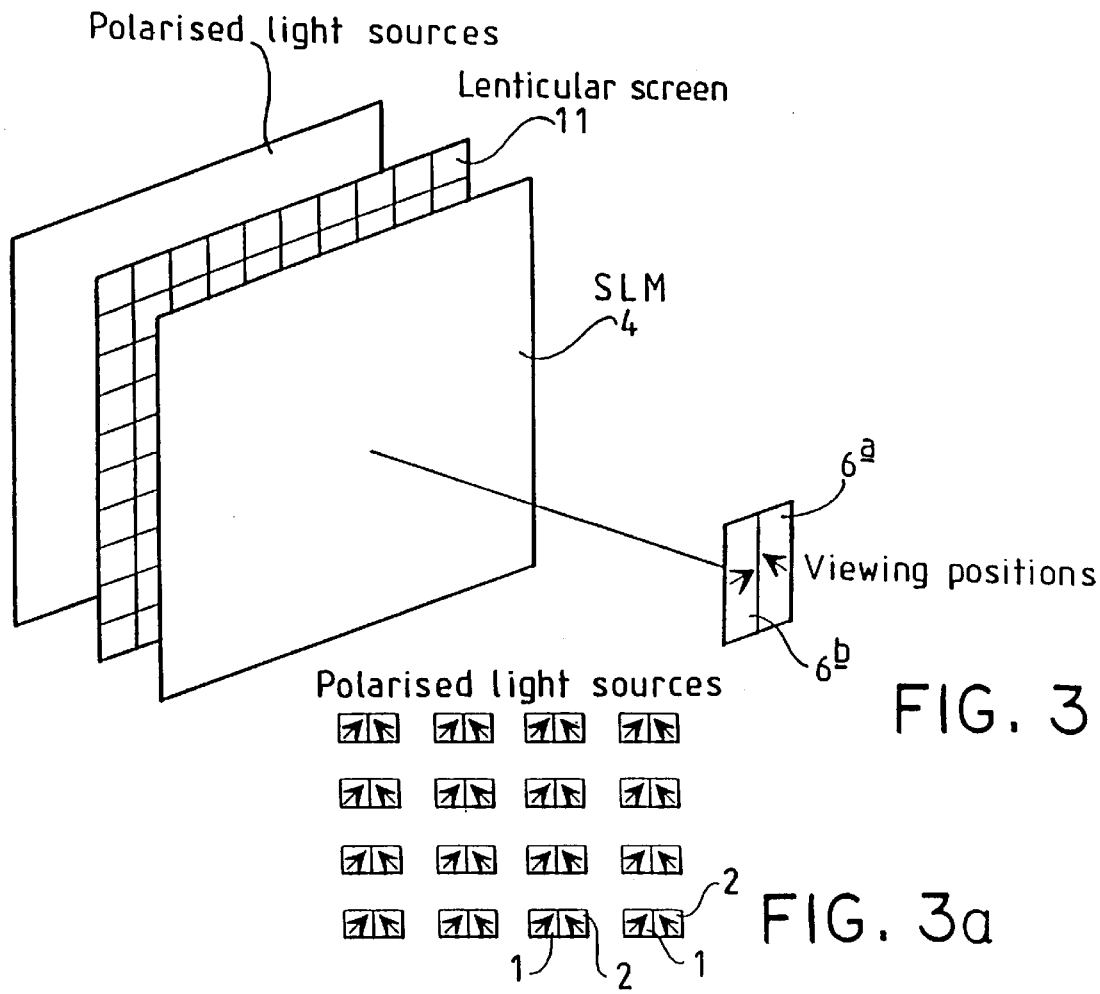
FIG. 3
FIG. 3a
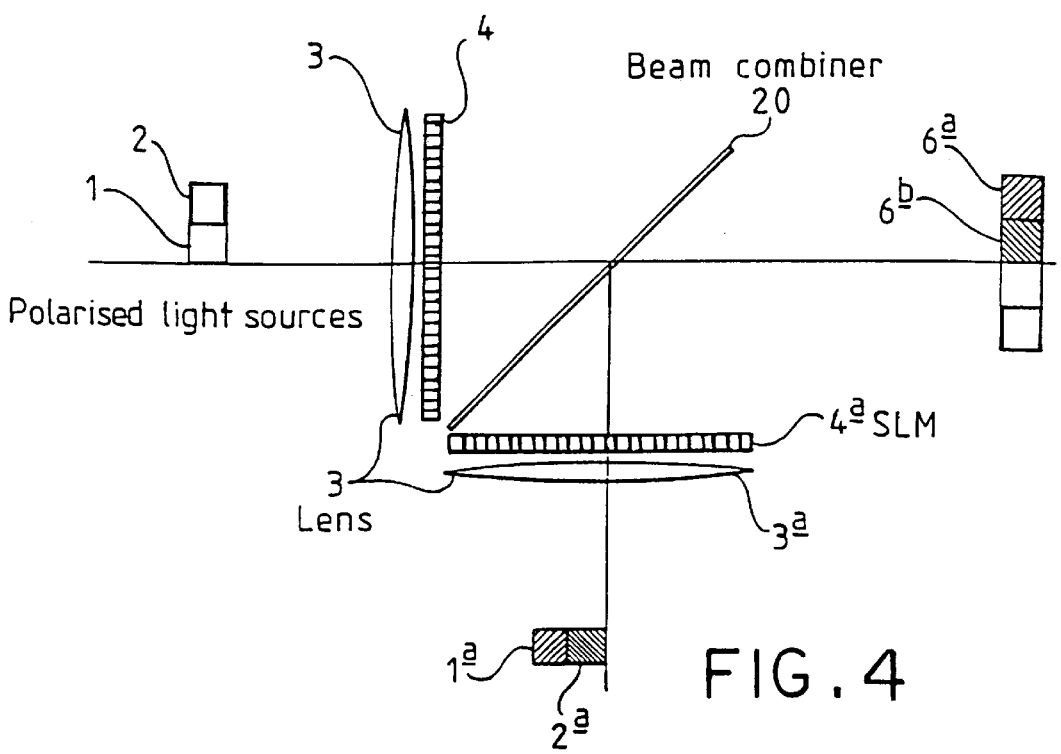
FIG. 4

AUTOSTEREOSCOPIC DISPLAY AND SPATIAL LIGHT MODULATOR

This invention relates to an autostereoscopic display.

The present invention also relates to a spatial light modulator. Such a modulator may be used in three dimensional (3D) displays.

A number of display devices have been disclosed which are capable of producing a stereoscopic display, but which require an observer to use viewing aids, commonly in the form of glasses. In one arrangement (J. Opt. Soc. Am. 30:230, 1940), the observer wears glasses incorporating polarized lenses, the axes of polarization of the lenses being crossed. When viewing a suitably encoded 3D image including polarized regions using the glasses, the image seen by one of the observers eyes is different from that seen by the other eye.

In Advanced Imaging, May 1992, pages 18 to 22, a device is described in which two halves of a stereographic image are interlaced and displayed using a liquid crystal display positioned behind a parallax barrier which consists of opaque regions of crossed micropolarizers and transparent regions therebetween. The pitches of the interlaced images and the barrier are such as to define first viewing positions at which a first of the halves is visible and second viewing positions at which the other half is visible. If an observer is positioned so that one of his eyes is at one of the first viewing positions and his other eye is at one of the second viewing positions, the stereographic image can be viewed. The function of the micropolarizers is to form a parallax barrier, the polarization of the light transmitted thereby being substantially unchanged.

EP 0 541 374 discloses a stereoscopic 3D display of the time multiplexed type in which a light source illuminates a liquid crystal device which displays left-eye and right-eye images alternately. A modulator modulates the light reflected by the liquid crystal device such that light carrying the left-eye images is polarised in one direction and light carrying the right-eye images is polarised in the orthogonal direction. The light from the modulator is projected onto a screen which has to be viewed through viewing aids in the form of glasses with orthogonally polarised filters in order for an observer to perceive the 3D image.

U.S. Pat. No. 5,264,964 discloses a 3D system in which a pixellated micropolariser is associated with a spatially multiplexed image. The image may be viewed stereographically through polarisation analysing glasses. Alternatively, a parallax barrier, for instance formed by further micropolarisers, may be used to permit autostereoscopic viewing.

WO85/02914 discloses a liquid crystal display (LCD) using polymeric substrates with a polariser located between the liquid crystal and each substrate so that the optical anisotropy of the polymeric substrates does not affect operation of the LCD.

GB 2 155 193 discloses an LCD having substrates formed by laminating a polariser between layers of stretched polyester. The substrates are arranged with the stretch directions of the polyester parallel to each other so as to prevent deformation from affecting electrode alignment.

The term "mode" as used herein refers to the degree of attenuation of light by a liquid crystal element in the absence of an applied field across the liquid crystal. There are two such modes, namely a normally white mode in which there is low attenuation in the absence of an applied field and a normally black mode in which there is high attenuation in the absence of an applied field.

According to a first aspect of the invention, there is provided a display as defined in the appended claim 1.

Preferred embodiments of the first aspect of the invention are defined in the appended claims 2 to 19.

It is thus possible to provide an autostereoscopic display in which a lenticular screen does not have to be aligned to the pixels of a spatial light modulator to a high tolerance. Accordingly, optical component cost is reduced. Further, it is possible to separate physically a backlight from the spatial light modulator. Thus, it is easier to implement observer tracking.

In arrangements where lenticular screens and optical components such as Fresnel lenses are provided, the pitches of such components are not determined by the pitch of the spatial light modulator. Accordingly, the pitches may be chosen to optimise performance of a mechanical steering system for observer tracking.

It is also possible to provide a flat panel display which can display full resolution 2D images. Such displays may be used for reversionary stereoscopic operation with polarising glasses and, using such glasses, for low crosstalk autostereoscopic operation. An observer can be tracked by control of the light source and multiple observers are possible.

According to a second aspect of the invention, there is provided a spatial light modulator as defined in the appended claim 20.

According to a third aspect of the invention, there is provided a spatial light modulator as defined in the appended claim 45.

Preferred embodiments of the second and third aspects of the invention are defined in the appended claims 21 to 44.

It is thus possible to provide a spatial light modulator which may be used in 3D displays and which suffers from substantially reduced parallax errors. For instance, cross talk, pseudoscopic viewing, and the imaging of regions between pixels are all substantially reduced and a good off-axis viewing angle performance is provided. Further, all of the pixels have well-matched viewing angles. In particular, the contrasts of the pixels are well-matched throughout a large range of horizontal and vertical viewing positions.

It is further possible to provide a spatial light modulator which can be used in autostereoscopic 3D displays and stereoscopic 3D displays. Some embodiments can be used in these two types of 3D display by reversing the direction of light passing through the modulator. Others can be used in either type of display with the same direction of light so that switching between stereoscopic and autostereoscopic operation may be achieved by changing between polarised and non-polarised light sources. Furthermore, it is not necessary to move or align precisely any parallax element on the display to change between autostereoscopic and stereoscopic operation, as is necessary with the arrangements disclosed in U.S. Pat. No. 5,264,964.

Such spatial light modulators can provide high extinction ratios between polarisation states so as to give improved cross talk performance. Standard liquid crystal display alignment layer configurations may be used and the modulators may have a large number of components in common with existing liquid crystal devices. Thus, such modulators may be manufactured using a large number of the steps of existing liquid crystal display manufacturing techniques.

When a polariser is disposed on the outside of a spatial light modulator substrate, for instance as in conventional liquid crystal displays, the substrate must be highly isotropic to avoid any change in polarisation direction which would result in reduced extinction and therefore in reduced spatial light modulator contrast. Glass is typically used as the substrate so as to meet this requirement. There is a strong desire to use plastic substrates for liquid crystal display fabrication so as to reduce weight. However, as is well known, many plastics are not optically isotropic. This is one reason why plastic liquid crystal displays have been difficult to produce economically.

By disposing the polariser inside a spatial light modulator, such as a liquid crystal display, the requirement for a highly isotropic substrate can be relaxed. This allows many cheaper plastics to be considered suitable for, for instance, a liquid crystal display substrate. Thus, embodiments of the present invention with internal polarisers have the further advantage of being able to use anisotropic substrates. For instance, if a plastic substrate is uniformly birefringent across its surface, then the birefringence can be accounted for in internal polarisation adjusting layers.

The invention will be further described, by way of example, with reference to the accompanying drawings, in which:

FIG. 1 is a diagrammatic perspective view illustrating an autostereoscopic display constituting a first embodiment of the invention;

FIG. 2 is a view similar to FIG. 1 of a display constituting a second embodiment of the invention;

FIG. 2a is an enlarged view of part of the display of FIG. 2;

FIG. 2b is a view similar to FIG. 2a of a modification;

FIG. 3 is a diagrammatic view of a display constituting a third embodiment of the invention;

FIG. 4 is a diagrammatic plan view of a display constituting a fourth embodiment of the invention;

Like reference numerals refer to like parts throughout the drawings.

Figure 5:
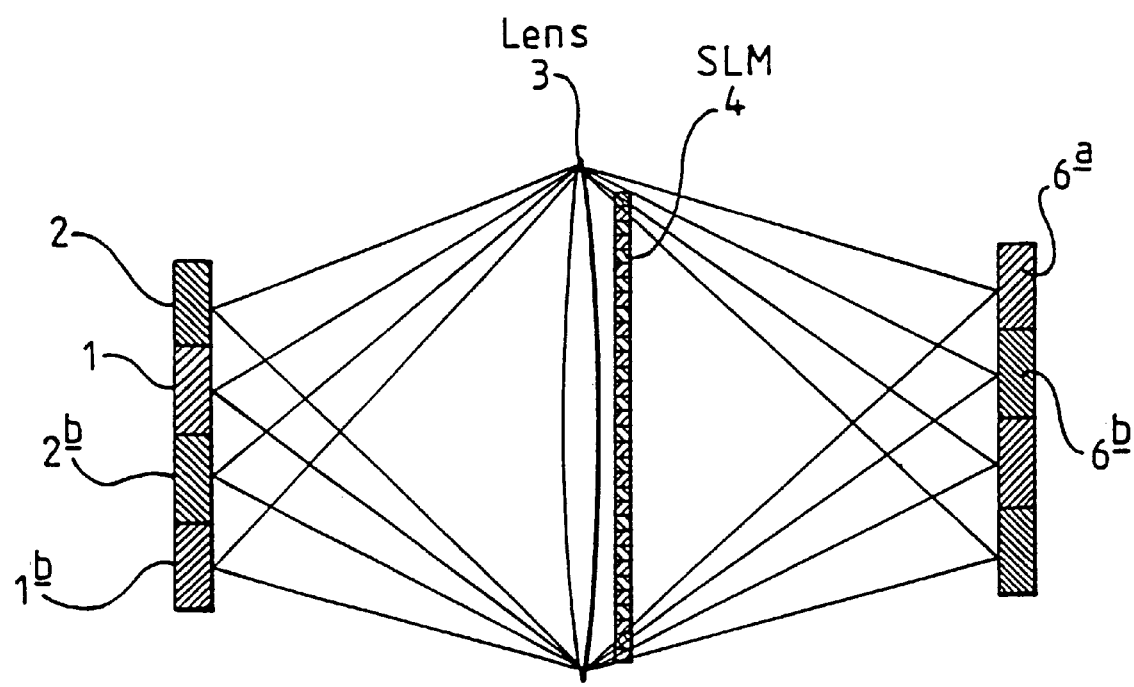
FIG. 5 is a diagrammatic plan view of a display constituting a fifth embodiment of the invention.

The display device illustrated in FIG. 1 comprises an illumination system in the form of a pair of light sources 1, 2 arranged to emit plane polarized light, the axis of polarization of the light emitted by one of the sources 1 being perpendicular to the axis of polarization of the light emitted by the other source 2. The emitted light is incident upon an optical system comprising a lens 3 arranged to image the light so as to produce an image of the first light source 1 at a first viewing zone 6a and an image of the second light source 2 at a second viewing zone 6b spaced from the first viewing zone. The lens 3 is of the type which does not affect the polarization of light incident thereon.

The light transmitted by the lens 3 is inqident upon a spatial light modulator (SLM) 4 in the form of a liquid crystal device comprising a plurality of liquid crystal picture elements each of which is arranged to modulate the light intensity, a control circuit 7 being arranged to control the SLM 4 in order to produce the desired display.

The SLM further comprises an array of polarization adjusting means 5 each of which is adjacent and aligned with a respective picture element of the SLM 4. The polarization adjusting means are of two types, one type 5a being substantially transparent to light of the polarization of the first light source 1 and substantially opaque to light from the second light source 2, and the other type 5b being substantially transparent to light from the second light source 2 but substantially opaque to light from the first light source 1. This effect is achieved in the SLM illustrated in FIG. 8 by arranging the first layer of polarizing elements so that the polarizing elements of the first type 5a have their axes of polarization parallel to the polarization axis of the first light source 1 and the polarizing elements of the second type 5b have their polarization axes parallel to the axis of polarization of the second light source 2. Because the polarization axes of the light sources 1, 2 are perpendicular to one another, so are the polarization axes of the first and second types 5a, 5b of polarizing element. In the embodiment shown in FIG. 1, the polarizing elements are arranged in a checkerboard fashion, but the polarizing elements-could alternatively be arranged in other patterns, such as vertical or horizontal stripes of alternating polarization.

In use, the control circuit 7 is arranged so that the picture elements adjacent the polarizing elements of the first type 5a display one of a pair of stereoscopic pictures, which is visible in the first viewing zone 6a, the other of the pair of stereoscopic pictures being displayed by the picture elements of the second type 5b and being visible in the second viewing zone 6b. By positioning one eye in the first viewing zone 6a and the other eye in the second viewing zone 6b, the observer sees the full stereoscopic image without requiring the use of viewing aids.

If the light sources 1, 2 are moved with respect to the lens 3, the locations of the viewing positions will also move. By moving the light sources 1, 2, it is therefore possible to provide a display device in which a moving observer always sees the stereoscopic image, the light sources 1, 2 being arranged to move so that the viewing zones 6a, 6b track the observer. The content of the image may also be adjusted upon detection of movement of the observer in order to provide an image look-around facility.

Alternatively or additionally to such relative lateral movement, the light sources 1, 2 and the lens 3 may rotate together about a vertical axis to provide or assist observer tracking. Providing such tracking by rotation only allows an observer to remain on or adjacent the axis of the lens 3 so as to avoid aberrational degradations of off-axis lens performance.

The device illustrated in FIG. 2 differs from that illustrated in FIG. 1 in that the light sources 1, 2 and the lens 3 are replaced by an illumination system, which comprises a single extended light source or "backlight" 9 and a polarizing panel 10 having alternating first and second polarizing stripes 10a 10b provided thereon, and an optical system comprising a lenticular screen 11. The first and second stripes 10a and 10b have orthogonal polarisations as illustrated in FIG. 2a.

The lenticular screen 11 comprises an array of cylindrical lens elements or lenticules arranged with their longitudinal axes parallel to the longitudinal axes of the stripes 10a, 10b of the polarizing panel 10. The width of each cylindrical lens element is substantially equal to twice the width of each stripe 10a, 10k of the polarizing panel 10. Thus, light of the first polarization transmitted by the lenticular screen 11 is transmitted in a different direction from light of the second polarization to provide first and second viewing zones or positions 6a, 6b as described above.

The SLM 4 is disposed adjacent the lenticular screen 11 and arranged to modulate the incident light to form the desired image. As in the embodiment of FIG. 1, the SLM 4 comprises a liquid crystal display device having a plurality of switchable picture elements and an array of polarization adjusting elements arranged so that each polarization adjusting element is adjacent a respective picture element of the SLM 4. Half of the polarization adjusting elements transmit light of the first polarization while substantially preventing transmission of light of the second polarization whereas the other half of the polarization adjusting elements transmit light of the second polarization while substantially preventing transmission of light of the first polarization. The two types of polarization adjusting element are arranged in a one dimensional alternating array similar to the polarizing panel 10, although other configurations such as a two dimensional checkerboard array may be used.

In use, light of the first polarization is transmitted by the lenticular screen 11 in a first direction and can be viewed at the first viewing positions 6a. Since the light can only pass through some of the polarizing elements, the image formed at the SLM and visible from the first viewing positions is that displayed by the picture elements of the SLM 4 which are adjacent the polarizing elements of the first type. Similarly, light of the second polarization is transmitted by the lenticular screen 11 in a second direction and can be viewed from second viewing positions 6b. The image displayed on the SLM and visible from the second viewing positions is that displayed by the picture elements which are adjacent the polarizing elements of the second type.

If an observer is positioned with one eye at the first viewing position and the other eye at the second viewing position and the SLM 4 is controlled so that the images visible from the first and second viewing positions form the two halves of a stereoscopic pair, the observer sees a three dimensional autostereoscopic image without requiring the use of viewing aids. Since the polarizing panel 10 is spaced from the lenticular screen 11, light from one of the stripes of the polarizing panel 10 may be incident upon a cylindrical lens element of the lenticular screen 11 other than the element directly adjacent thereto giving rise to the display device producing a plurality of pairs of viewing zones or "lobes" 6a, 6b. Tracking of a moving observer may be achieved by moving the polarizing panel 10 with respect to the lenticular screen 11, for instance by an electromechanical actuator, so that the observer maintains the autostereoscopic viewing condition. Alternatively or additionally as described hereinbefore, rotation of the whole backlight arrangement including the polarising panel 10 and the lenticular screen 11 may be used to provide or assist observer tracking. Combinations of lateral relative movement and rotation may be used to enhance freedom of movement of the observer and increase response speed.

The polarizing panel of FIG. 2b may be used instead of that in FIG. 2a, each pair of adjacent stripes 10a, 10b of the panel of FIG. 2b being separated by an opaque stripe 10c. By using such a panel, the pairs of adjacent viewing positions 6a, 6b are separated from one another to avoid the situation where the left and right eyes of the observer see the images intended for the right and left eyes, respectively, (pseudoscopic zones). Operation of the device is as described with reference to FIG. 2.

As an alternative to this arrangement, the lenticular screen 11 may be replaced by a converging lens of the type illustrated in FIG. 1. Similarly, the lens 3 of FIG. 1 could be replaced by an array of lenses, for example, a lenticular screen. The optical system chosen for use in the display device is largely independent of the illumination system selected. In the embodiment shown in FIG. 1, if more than one observer wishes to see the display, more than one pair of illuminators may be provided. In the embodiment shown in FIG. 2, use may be made of the additional lobes to allow more than one observer to see the display autostereoscopically.

FIG. 3 illustrates an embodiment which comprises a two dimensional array of pairs of polarized light sources 1, 2 (FIG. 3a), light from which is incident upon a lenticular screen 11 which comprises a two dimensional array of lens elements. Each lens element is arranged to direct light from a corresponding pair of light sources 1, 2 onto a SLM 4 to be viewed from a pair of viewing positions 6a, 6b. By moving the array of light sources 1, 2 with respect to the lenticular screen 11, the viewing positions 6a, 6b can be arranged to track a moving observer, such tracking being in both a horizontal direction and a vertical direction.

Figure 8:
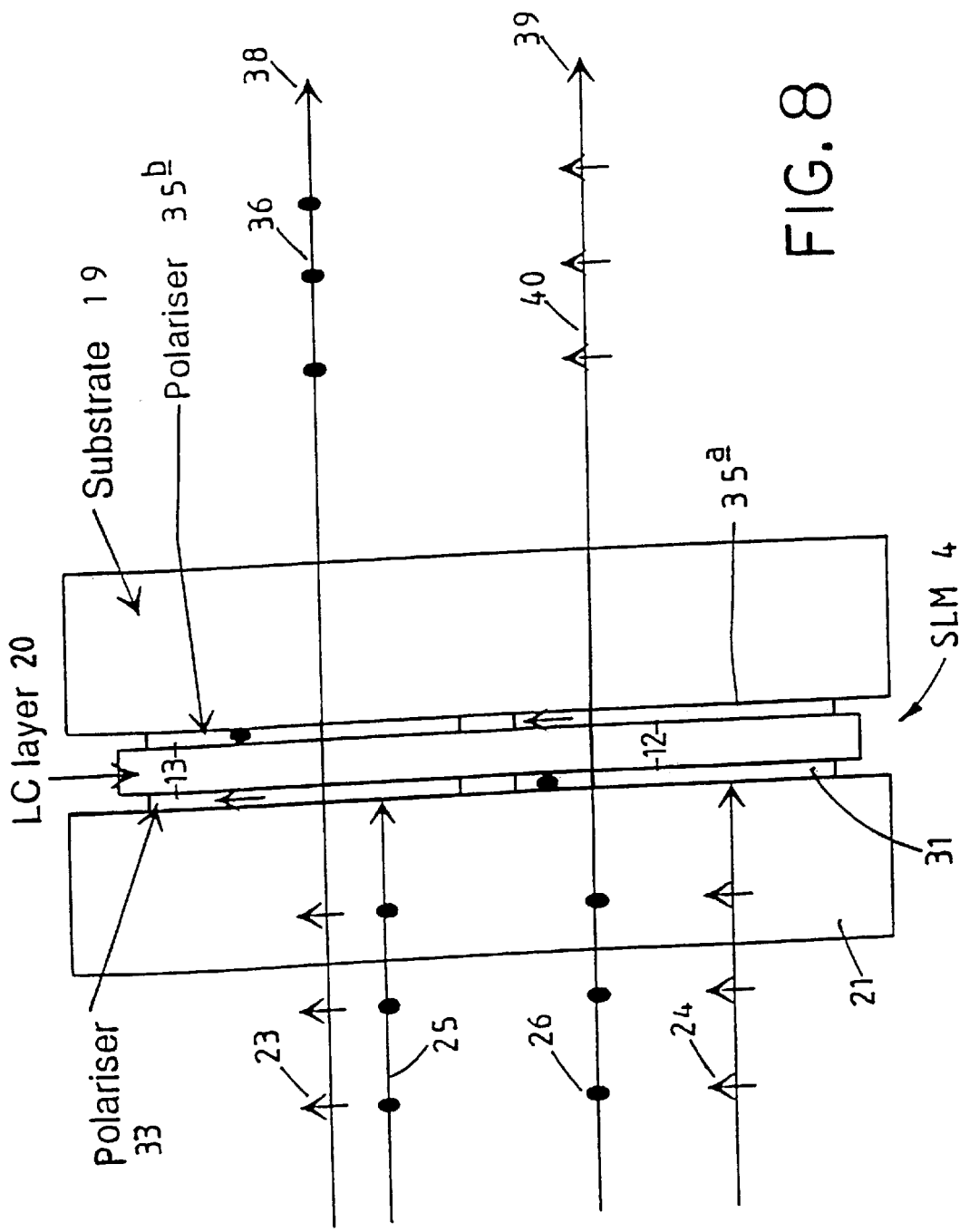

The embodiments illustrated in FIGS. 1 to 3 use the SLM of FIG. 8, in which the light transmitted by the SLM is of two orthogonal components. The choice of SLM is largely independent of the optical and illumination systems used, and others of the illustrated SLMs, or indeed other SLMs not described or illustrated herein, could be used. It is advantageous to use an SLM of the type disclosed herein in which the switching layer of the SLM transmits only one of the polarization components as such an SLM does not suffer from intensity variations between the two views of an autostereoscopic image with changes of viewing angle as in the known type of SLM. If the two views have unmatched viewing angles, this can result in visual stress and false depth cues via the Pulfrich effect so that the effective observer viewing position freedom for such a display is more limited.

The device illustrated in FIG. 4 is similar to that illustrated in FIG. 1 but includes a beam combiner 20 between the SLM 4 and the observer and a second identical arrangement comprising an SLM 4a, a lens 3a and a pair of light sources 1a, 2a for transmitting light to the beam combiner 20. The use of the beam combiner 20 allows two pairs of autostereoscopic images to be produced, enabling the observer to view four different 2D views of the image from the appropriate viewing positions to provide a look around facility, or allowing two observers to see the 3D image. If desired, each pair of images may be moved independently so as to track respective observers by moving the corresponding pair of light sources 1, 2, 1a, 2a laterally with respect to the corresponding lenses 3, 3a and/or rotating the corresponding light sources and lenses. The beam combiner 20 may comprise a partially reflecting, partially transmitting mirror.

FIG. 5 illustrates a display device in which time multiplexing is used in order to enhance the autostereoscopic display. The device is similar to that illustrated in FIG. 1 but includes a second pair of polarized light sources 1b, 2b adjacent the pair present in the FIG. 1 embodiment. In use, the light sources 1, 2 are switched on to illuminate the SLM 4, producing a first pair of images as described above. After a short predetermined time period, the light sources 1, 2 are switched off, the display of the SLM 4 changed, and the light sources 1b, 2b switched on so as to produce a second pair of images spaced from the first pair of images. Each of the light sources can be segmented with different segments being switched synchronously with the addressing of the SLM 4. The device illustrated in FIG. 5 is capable of displaying four different images at spaced locations using a single SLM 4. By using an SLM 4 capable of very rapid display changes and pairs of light sources 1, 2, 1b, 2b which can be switched at a suitably high speed, a substantially flicker free display can be provided. Displays capable of displaying more images, for example sixteen images, may also be produced in this manner with a sufficiently high frame rate SLM 4.

Figure 6:
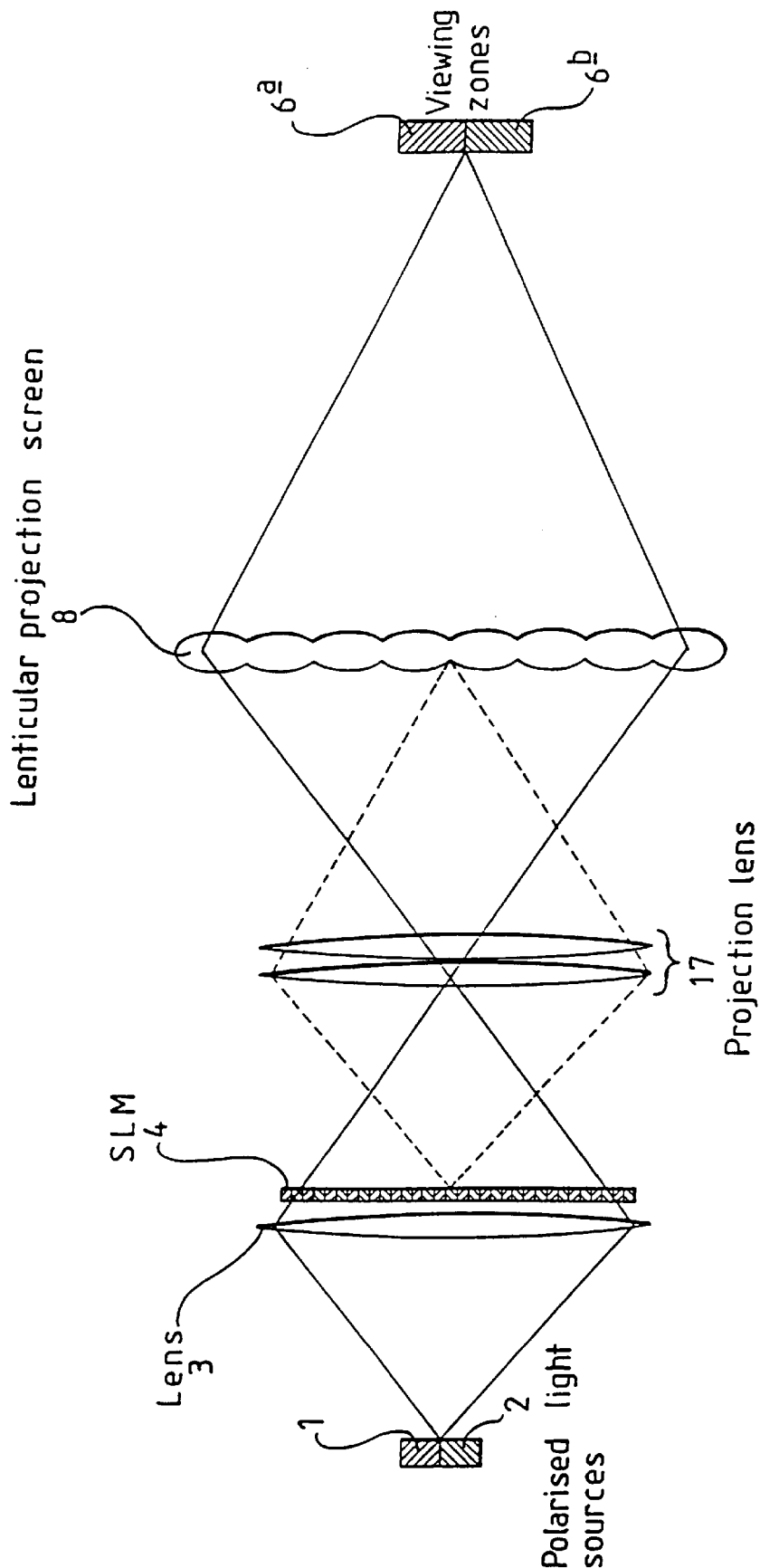
FIG. 6 is a diagrammatic plan view of a display constituting a sixth embodiment of the invention.

The display device illustrated in FIG. 6 differs from that of FIG. 1 in that a projection lens arrangement 17 is provided to project the images onto a lenticular screen 18 so that, when viewed from zone 6a, the observer sees one of a stereoscopic pair of images and, when viewed from zone 6b, the other image of the stereoscopic pair is seen. The display device illustrated in FIG. 6 has the advantage that a relatively large image can be produced.

Other types of projection configuration may be used, for example as described in EP 0 653 891. In addition, the polarization adjusting means may be spaced from the plane of the liquid crystal layer of the SLM 4, for example by being provided on the outer surface of the glass substrate thereof. A further alternative is to position the elements of the polarization adjusting means on the surface of the projection screen 8 rather than on the liquid crystal of the SLM 4.

As is well known, normally black and normally white pixels have different output grey levels with applied voltage. Accordingly, in order to provide matched performance for on-axis viewing, hardware or software corrections must be applied. This increases the complexity of the display.

The term "mode" as used herein refers to the degree of attenuation of light by a liquid crystal element in the absence of an applied field across the liquid crystal. There are two such modes, namely a normally white mode in which there is low attenuation in the absence of an applied field and a normally black mode in which there is high attenuation in the absence of an applied field.

Figure 25:
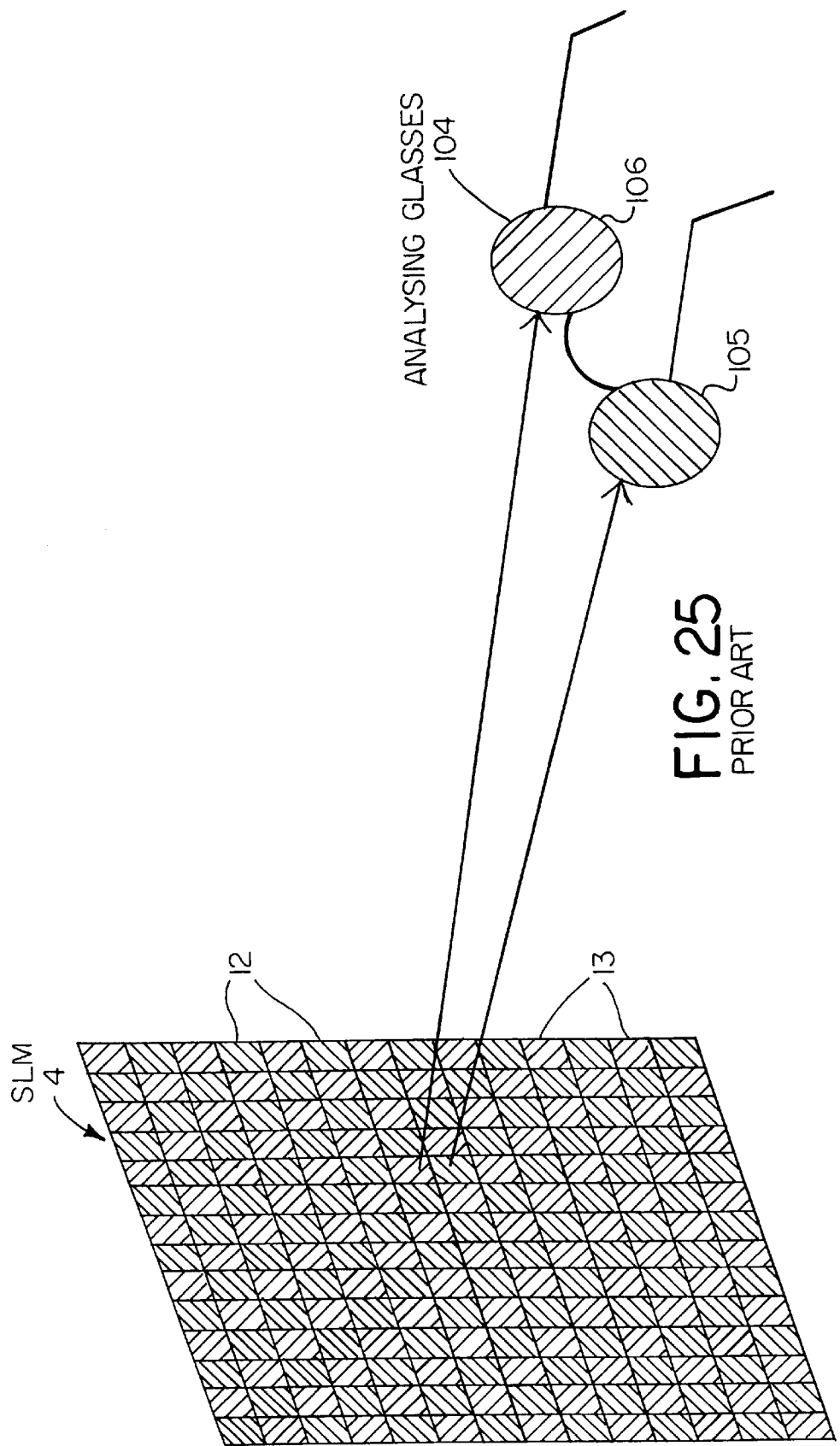
FIG. 25 illustrates diagrammatically a known stereoscopic display.

FIG. 25 illustrates diagrammatically the operation of a stereoscopic 3D display of known flat panel polarisation type. The display comprises an SLM 4 formed by a liquid crystal device (LCD) and comprising a regular array of pixels (picture elements). The pixels are arranged as two sets of interlaced pixels with the pixels of the first set supplying light having a first direction of (linear or circular) polarisation and the pixels of the second set supplying light having the orthogonal polarisation. This is indicated by the different directions of shading in FIG. 25. The pixels 12 of the first set display a first image of a stereoscopic pair for viewing by the left eye of an observer whereas the pixels 13 of the second set display an image for viewing by the right eye of the observer. A suitable unpolarised backlight (not shown) supplies light to the SLM 4.

In order for the observer to see the 3D stereoscopic image, analysing glasses 104 are worn. The glasses 104 comprise polarisers 105 and 106 for the left and right eyes, respectively, of the observer. The polarisation directions of the polarisers 105 and 106 match the output polarisations of the pixels 12 and 13 of the first and second sets, respectively. Thus, the polariser 105 passes the image encoded by the pixels 12 of the first set while greatly attenuating light from the pixels 13 of the second set whereas the polariser 106 passes light from the pixels 13 with relatively little attenuation while greatly attenuating light from the pixels 12.

In the case of linear polarisers, the cross talk performance degrades as the observer tilts his head because extinction by the polarisers 105 and 106 of light from the pixels 13 and 12, respectively, is reduced. Cross talk for the right eye of the observer whose head is tilted by an angle $\theta$ is given by:

$$I_L \cos^2(\pi/2-\theta)/I_R \cos^2\theta$$

where $I_L$, and $I_R$ are the light intensities for the left and right eyes, respectively. For a tilt angle of $\theta=10°$, which is of the order of one full pupil height, the cross talk is 3%.

The use of circular polarisation techniques substantially eliminates cross talk caused by tilting of the head of the observer. However, circular polarisers tend to suffer from a poor base level of cross talk which is believed to be caused by limited optical bandwidth of circular polarisers.

Figure 26:
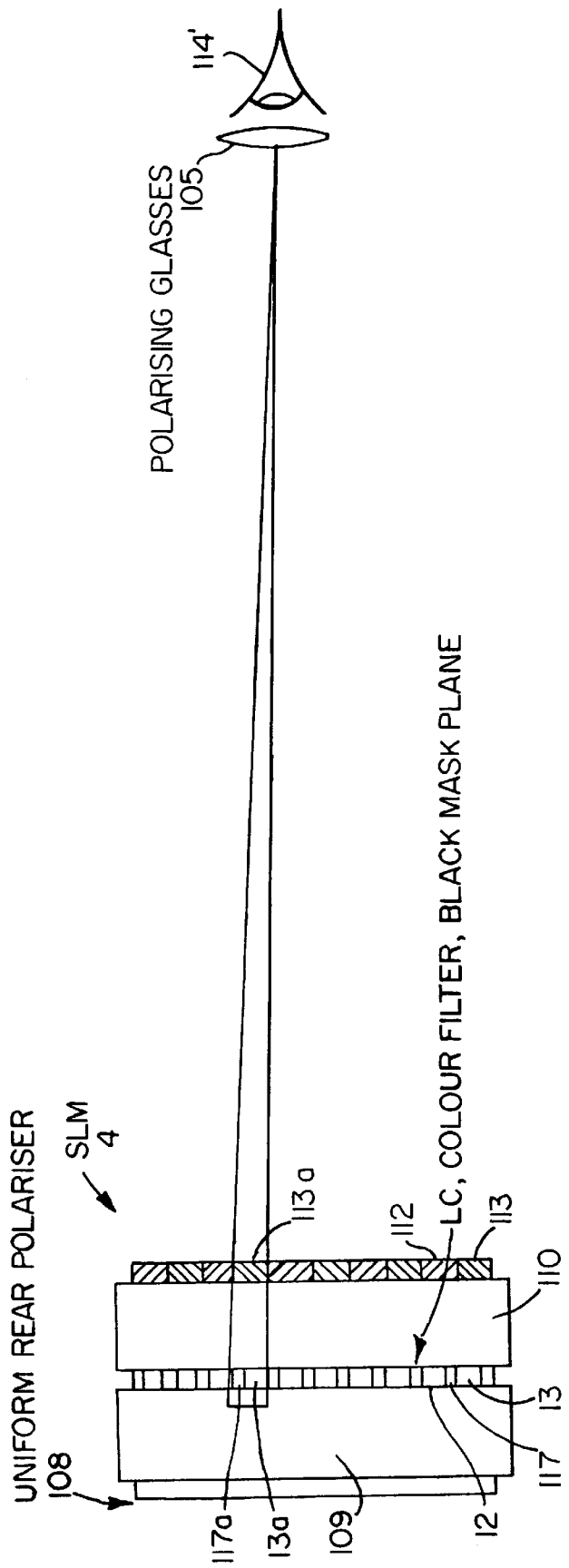
FIG. 26 is a diagrammatic vertical section of the display of FIG. 1 illustrating correct viewing.
Figure 27:
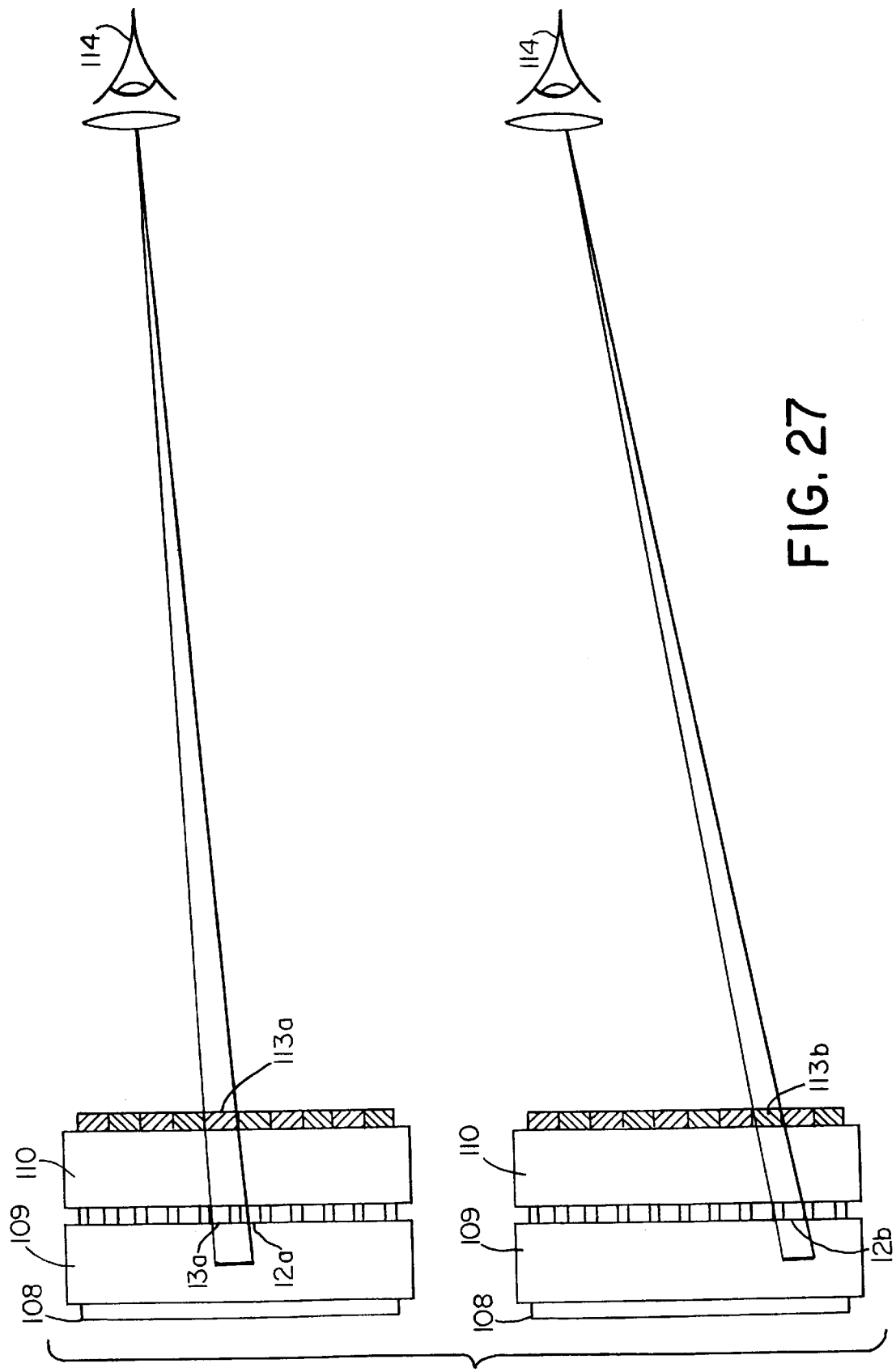
FIG. 27 is diagrammatic vertical section of the display of FIG. 1 illustrating disadvantages of this display.

As shown in FIGS. 26 and 27, the SLM 4 comprises a uniform rear polariser 108 and glass substrates 109 and 110 having a thickness of the order of 1 mm whereas the size of the pixels 12 and 13 is of the order of 100 micrometers. The pixels 12 and 13 are located on the internal surface of the substrate 110 whereas a micropolarising layer comprising polarising pixels 112 and 113 aligned with the pixels 12 and 13, respectively, is located on the external surface of the substrate 110. A black matrix or mask 117 which covers the gaps between the pixels, for instance where electrodes, transistors, and capacitors are located, is intended to improve image contrast.

FIG. 26 illustrates correct positioning of an observer eye 114 for viewing the 3D stereoscopic image. Light from a pixel displaying a left eye image element passes from the pixel 13a through the corresponding polarising pixel 113a and through the polarising glasses 105 to the observer eye 114. The observer eye 114 sees only the pixel 13a and the adjacent portion 117a of the black mask. The right eye (not shown) of the observer similarly sees only the pixels 12 and adjacent parts of the black mask 117.

The upper part of FIG. 27 illustrates the view which the observer eye 114 has after moving upwardly with respect to the position illustrated in FIG. 26. In this position, the eye 114 can see through the polarising pixel 113a to part of the pixel 13a which is aligned with the polarising pixel 113a. However, because of parallax errors resulting from the relatively thick substrate 110, the eye 114 can also see part of the pixel 12a through the polarising pixel 113a. Thus, the eye 114 sees pixels displaying both the left and right eye images of the stereoscopic pair, which results in substantial cross talk between these images and reduction in or loss of the 3D effect.

The lower part of FIG. 27 illustrates the situation when the eye 114 has moved further vertically. In this case, the eye 114 can see the pixel 12b through the polarising pixel 113b. Thus, the left eye 114 sees the right eye pixel 12b. Similarly, the right eye sees the left eye pixel so that a pseudoscopic image is observed and the 3D effect is lost.

The observer thus has a very limited vertical viewing range if the 3D image is to be viewed stereoscopically with acceptable cross talk and image intensity and contrast ratio. If the micropolariser layer pixels are arranged as horizontal stripes freedom of observer movement will be limited vertically whereas vertical stripes will result in limited horizontal freedom of movement. A "chequerboard" pixel arrangement will limit freedom of movement both horizontally and vertically. Even if an observer tracking system is provided to track the position of the observer and to swap the left and right images in order to prevent pseudoscopic viewing when the observer moves, cross talk and contrast degradation produced by the mechanism illustrated in FIG. 27 still provides poor results for intermediate positions of the observer between image switching positions.

Figure 28:
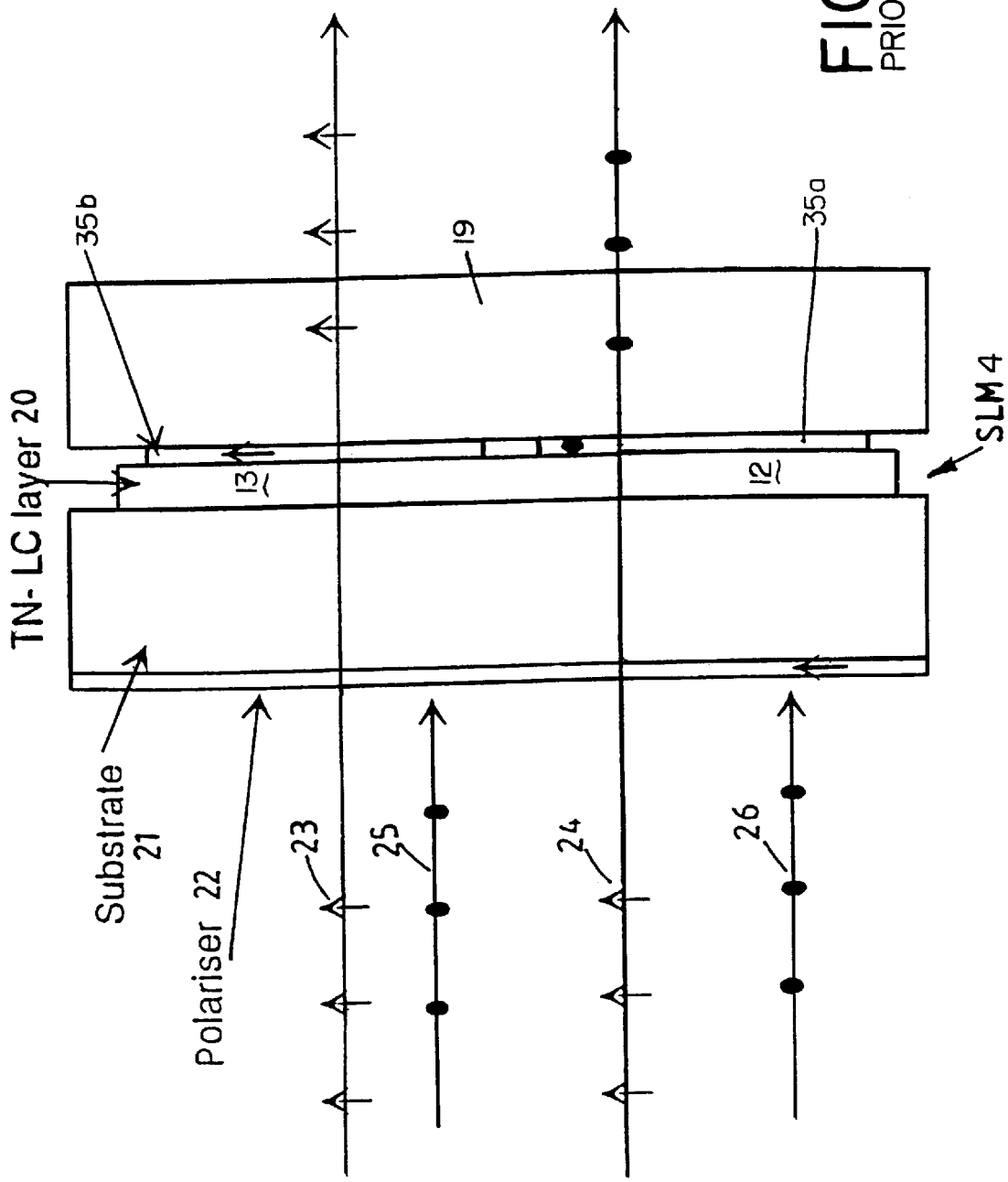
FIG. 28 is a diagrammatic cross-sectional view of two adjacent pixels of a known spatial light modulator (SLM)

The known type of SLM shown in FIG. 28 substantially avoids the problems created by parallax between the pixels 12 and 13 and the polarisation layer providing the polarisation pixels 35a and 35b by locating the polarisation pixels between the glass substrate 19 and a liquid crystal layer 20 which is shown as a twisted nematic liquid crystal (TN-LC) layer in FIG. 28. By locating the output polarising pixels 35a and 35b substantially immediately adjacent the image pixels in the liquid crystal layer 20, the parallax problems illustrated in FIGS. 26 and 27 are substantially overcome.

The SLM 4 shown in FIG. 28 further comprises a glass substrate 21 and an input polariser 22. Other elements, such as electrode layers and alignment layers, are not shown for the sake of clarity.

In use, the input polariser 22 passes light of a first linear polarisation at 23 and 24 to the pixels 12 and 13 whereas light of the orthogonal linear polarisation shown at 25 and 26 is greatly attenuated in accordance with the extinction ratio of the input polariser 22. In the drawings, the arrows such as 23 and the dots such as 26 indicate orthogonal linear polarisations of transmitted light.

The pixel 12 has an input polariser formed by part of the polariser 22 and the output polariser 35a whose directions of polarisation are perpendicular to each other. Thus, the pixel 12 operates in the normally white mode i.e. transparent in the absence of an applied electric field across the liquid crystal layer of the pixel 12. This is because a standard TN-LC rotates the input polarisation by 90 degrees in the unpowered state. The pixel 13 has an input polariser formed by the aligned part of the polariser 22 and an output polariser 35b whose polarisation directions are parallel. Thus, the pixel 13 operates in the normally black mode i.e. substantially opaque in the absence of an applied electric field across the liquid crystal layer of the pixel 13.

As is well known, normally black and normally white pixels have different output grey levels with applied voltage. Accordingly, in order to provide matched performance for on-axis viewing, hardware or software corrections must be applied. This increases the complexity of the display.

Another problem with SLMs of the type shown in FIG. 28 having pixels operating in the normally black and normally white modes is that the contrast performance varies with the angle of viewing away from the axial viewing position. For instance, for different vertical viewing positions of the observer, a matched contrast performance for the pixels 12 and 13 for on-axis viewing becomes substantially mismatched. This gives rise to differences in apparent brightness and contrast between the left and right eye views which change as an observer moves with respect to the display. This can result in visual stress and false depth queues via the Pulfrich effect so that the effective observer viewing-position freedom for a display of the type illustrated in FIG. 28 is again limited.

Figure 7:
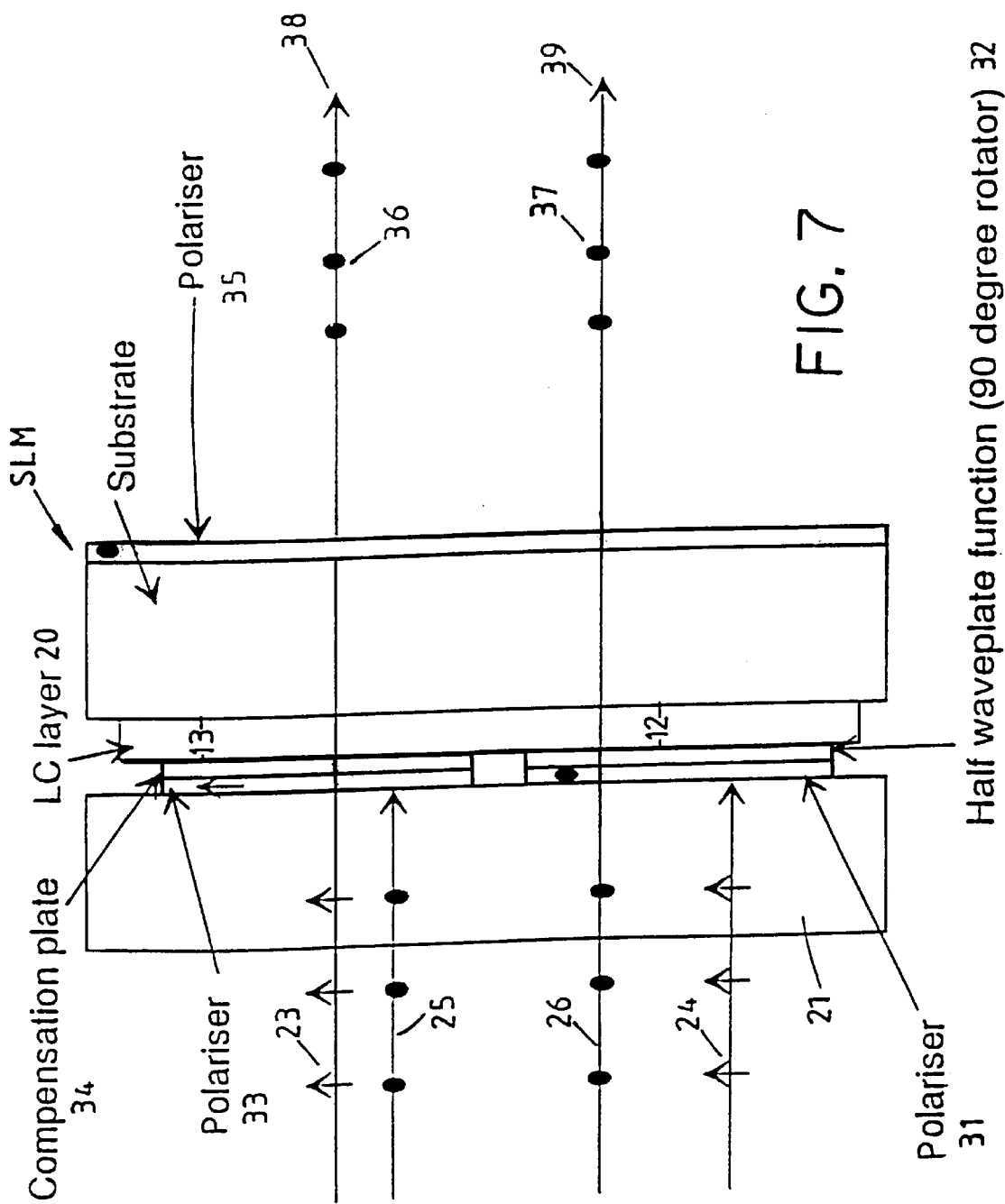
FIGS. 7 to 22 are diagrammatic cross-sectional views of two adjacent pixels of SLMs which may be used in the displays of FIGS. 1 to 6.

FIG. 7 shows two adjacent pixels of an SLM which constitutes an embodiment of the invention and which may be used in the displays shown in FIGS. 1 to 6. The pixels 12 and 13 have input polarisers 31 and 33, respectively whose polarisation directions are perpendicular to each other. The input polarisers 31 and 33 form regions of a pixellated array of micropolarisers located at the internal surface of the substrate 21. A 90 degree rotator 32, which rotates the plane of linear polarisation by 90 degrees, is disposed between the input polariser 31 and the liquid crystal pixel 12. The rotator 32 may provide rotation by birefringence (e.g. a half waveplate), guiding, or a combination of the two and rotates the polarisation of light from the input polariser 31 by 90 degrees. A compensation plate 34 is disposed between the input polariser 33 and the liquid crystal pixel 13 to fill the gap which would otherwise occur between the input polariser 33 and the (constant thickness) liquid crystal layer 20 i.e. the compensation plate 34 can be optically isotropic, in which case it compensates for the thickness of the half waveplate function in the other group of pixels. However, it is also possible to use further compensation plates (not shown) which contain an anisotropic component (such as birefringence) which can further improve the viewing angle properties of the display. The compensation plate 34 may also be used to provide all or part of the anisotropic component for the associated pixel 13. The rotator 32 and the compensation plate 34 may include colour filtering in order to provide a colour display.

The surface of the substrate 19 which is external to the SLM carries a single layer non-pixellated output polariser 35.

With the direction of light through the SLM as shown by the arrows 38 and 39, the display may be operated in the autostereoscopic mode as described herein. A source of illumination (not shown) is located to the left of the SLM as shown in FIG. 7 and comprises adjacent light sources, one of which produces light having the linear polarisation illustrated at 23 and 24 and the other of which produces light having the linear polarisation indicated at 25 and 26. Light having the polarisation 23 and 24 is passed by the input polariser 33 but substantially blocked by the input polariser 31 whereas the light having the polarisation 25 and 26 is substantially blocked by the input polariser 33 but passed by the input polariser 31. The rotator 32 rotates the polarisation of light by 90° so that the light passing into the liquid crystal pixels 12 and 13 has the same polarisation.

The output polariser 35 has a polarisation direction which is perpendicular to the polarisation direction of input light to both the pixels 12 and 13. Accordingly, both the pixels 12 and 13 operate in the normally white mode. The output polariser 35 effectively generates grey scale for each of the pixels 12 and 13 and the output light 36 and 37 has the same polarisation for all of the pixels. Light from the pixels 12 of the first set is directed to a first viewing window for the left eye of the observer whereas light from the pixels 13 of the second group is directed to a second viewing window for the right eye of the observer. With the eyes correctly positioned, the observer sees an autostereoscopic 3D image.

The input polarisers 31 and 33 and the rotator 32 are disposed substantially adjacent the liquid crystal layer 20 so that parallax problems for off-axis viewing of the image are substantially reduced or eliminated throughout a wide range of observer viewing positions. Because all of the pixels operate in the same normally white mode, contrast performances are substantially matched for a wide range of viewing positions of the observer.

By reversing the direction of light through the SLM shown in FIG. 7, it may be used in a stereoscopic display. The illumination source may be a randomly polarised Lambertian backlight which is linear polarised by the polariser 35. Light from the liquid crystal pixel 12 is analyzed by the rotator 32 and the polariser 31 whereas light from the liquid crystal pixel 13 is analyzed by the polariser 33. The polarisation direction of light from the pixel 12 is therefore perpendicular to the polarisation direction of light from the pixel 13 and, by wearing suitable analysing glasses such as those shown in FIG. 25, an observer sees a stereoscopic image throughout an extended viewing region without degradations caused by parallax and mismatched off-axis contrast performance.

FIG. 8 shows an SLM 4 which differs from that shown in FIG. 7 in that the rotator 32, the compensation plate 34, and the output polariser 35 are omitted and output polarisers 35a and 35b of the type shown in FIG. 28 are provided in the form of a pixellated polarisation layer disposed between the liquid crystal layer 20 and the substrate 19.

With the direction of light as shown by the arrows 38 and 39 through the SLM 4, the SLM may be used as part of an autostereoscopic 3D display in the same way as the SLM shown in FIG. 7. The input polariser 31 passes light polarised in the direction 26 but blocks light polarised in the direction 24 whereas the input polariser 33 passes the light 23 but blocks the light 25. The pixels 12 and 13 operate in the normally white mode and the output polarisers 35a and 35b analyze the grey level, providing output light 36 and 40 with perpendicular polarisation directions. The observer does not need to wear analysing glasses for autostereoscopic viewing. However, by wearing such glasses with the left and right eye analyzer polarisation directions parallel to the polarisation directions of the output polarisers 12 and 13, respectively, residual cross talk at the eyes of the observer may be further reduced.

In fact, the SLM 4 shown in FIG. 8 is symmetrical with respect to the direction of light therethrough and can be used in a stereoscopic 3D display since output light from the pixels 12 has a polarisation direction perpendicular to that of output light from the pixels 13.

Figure 9:
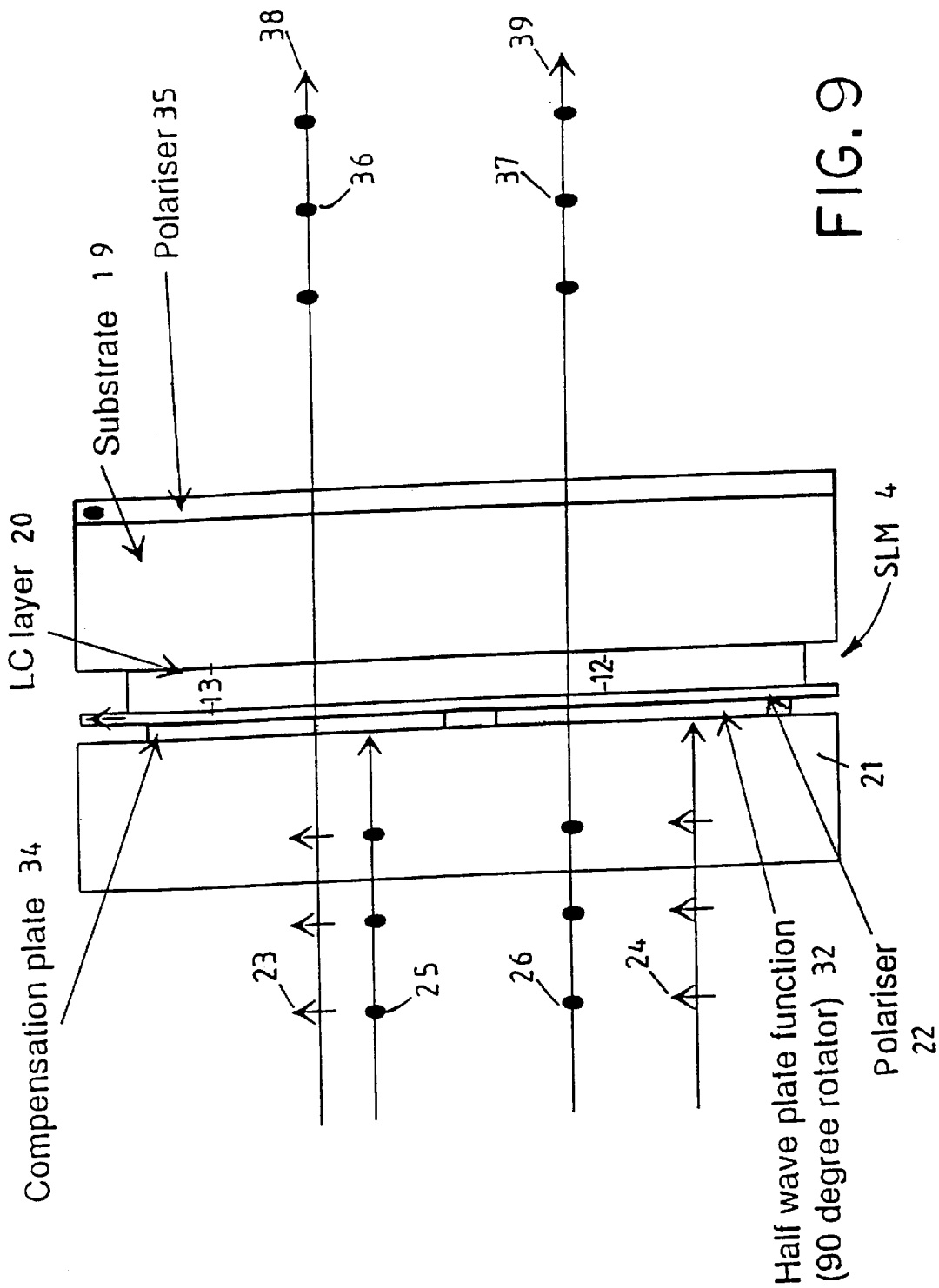

FIG. 9 shows an SLM 4 which differs from that shown in FIG. 7 in that the input polarisers 31 and 33 are replaced by a non-pixellated input polariser 22 disposed between the rotator 32 and the compensation plate 34 on the one side and the liquid crystal layer 20 on the other side.

For autostereoscopic operation, the light 23 and 25 from the polarised light sources passes through the compensation plate to the input polariser 22, which passes the light 23 and blocks the light 25. The rotator 32 rotates the polarisation of the light 24 and 26 so that the light 24 is blocked by the input polariser 22 but the light 26, following rotation, is passed to the liquid crystal pixel 12. The output polariser 35 analyses the grey scale from the pixels 12 and 13.

In the stereoscopic mode, light from a randomly polarised source passes in the opposite direction through the SLM 4. The output light from the liquid crystal pixels 12 and 13 is polarised by the polariser 22 and supplied direct from the pixel 13 while being rotated by 90 degrees by the rotator 32 of the pixel 12.

A manufacturing advantage of the embodiment of FIG. 9 compared with that of FIG. 7 is that only one pixellated layer, namely that comprising the rotator 32 and the compensation plate 34, is required. The internal polariser need not be pixellated. Thus, the number of mask steps during manufacture may be reduced.

Figure 10:
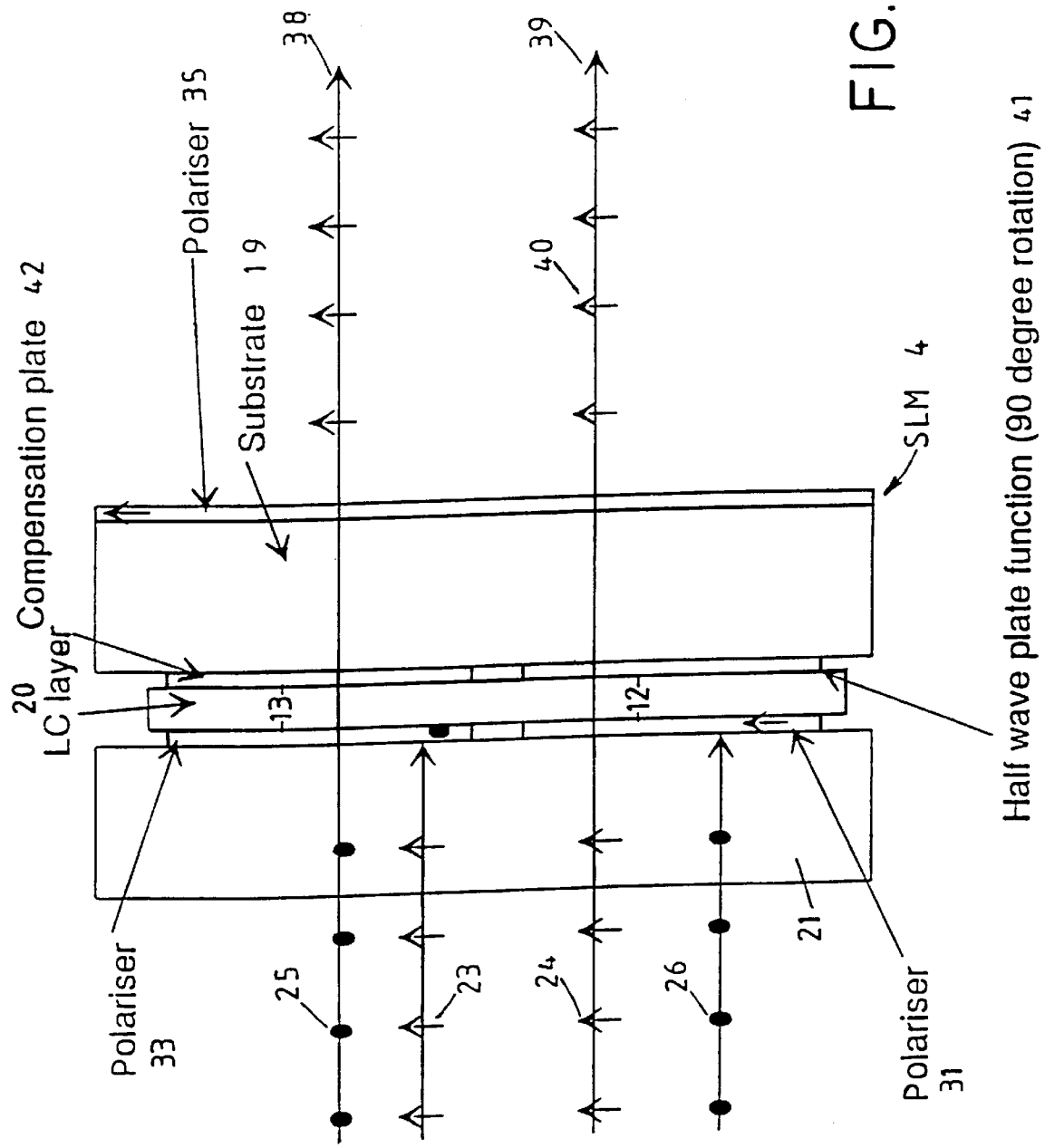

FIG. 10 shows an SLM 4 which differs from that shown in FIG. 7 in that the rotator 32 and compensation plate 34 are omitted and a 90 degree rotator 41 and a compensation plate 42 are provided. The rotator 41 is disposed between the liquid crystal layer 20 of the pixel 12 and the substrate 19 whereas the compensation plate 42 is disposed between the liquid crystal layer 20 of the pixel 13 and the substrate 19.

For autostereoscopic operation with orthogonally polarised light sources, the input polarisers 31 and 33 pass light of orthogonal polarisations Light from the pixel 13 is analyzed directly by the output polariser 35 whereas light from the pixel 12 is rotated by 90° by the rotator 41 and analyzed by the output polariser 35. Thus, both pixels 12 and 13 operate in the normally white mode.

For stereoscopic operation, the direction of light through the SLM 4 is reversed and the polarisers 31 and 33 supply light of orthogonal polarisations.

Figure 11:
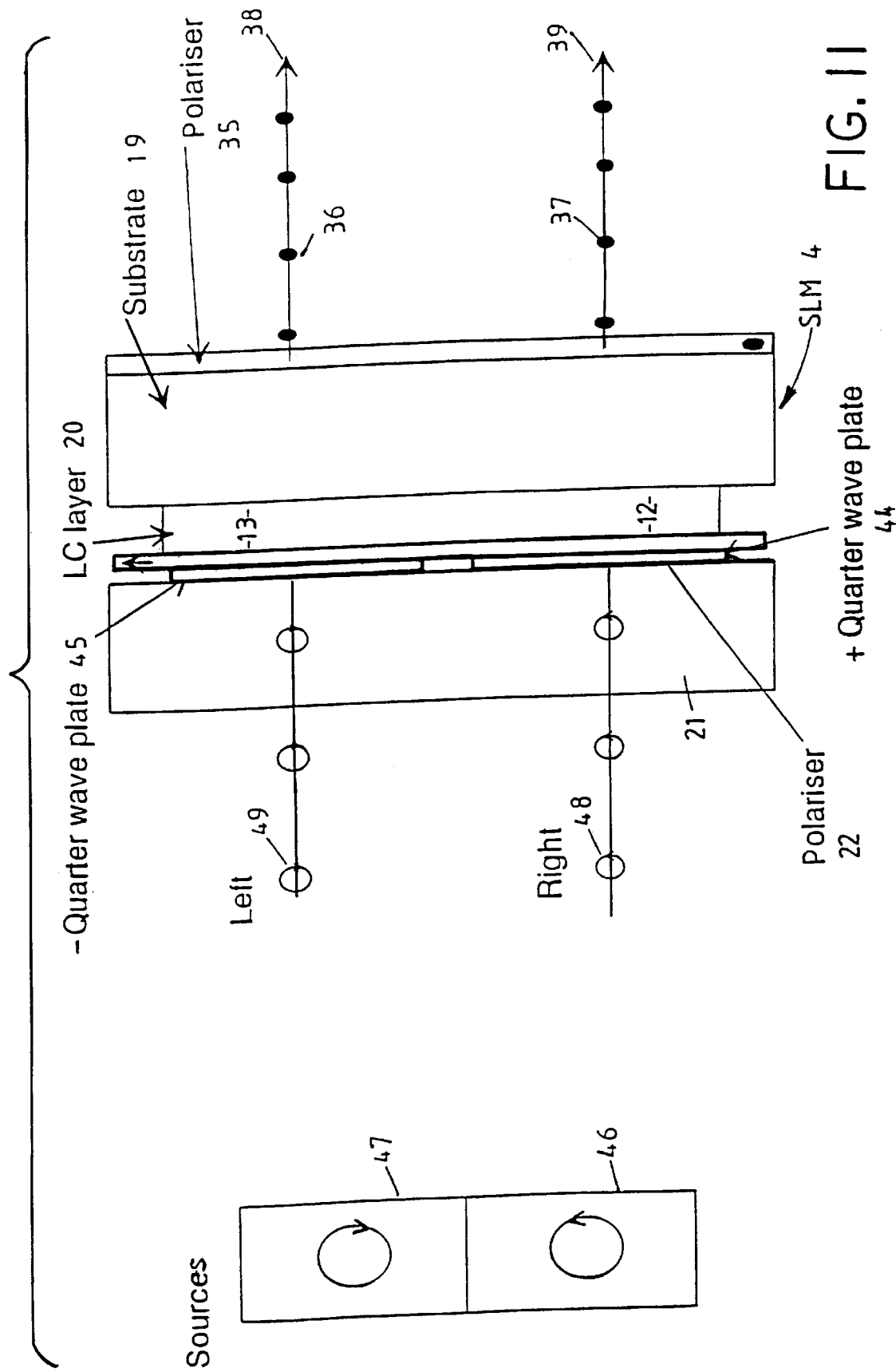

FIG. 11 shows an SLM 4 which differs from that shown in FIG. 9 in that the rotator 32 and the compensation plate 34 are replaced by a +quarter waveplate 44 and a −quarter waveplate 45, respectively.

FIG. 11 illustrates autostereoscopic operation of the SLM 4. Light sources 46 and 47 provide right-handed and left-handed circularly polarised light, respectively. The combination of the plate 44 and the input polariser 22 passes the right-handed polarised light 48 from the light source 46 but blocks the left-handed polarised light from the source 47. Similarly, the plate 45 and the input polariser 22 pass left-handed circularly polarised light from the light source 47 but block light from the source 46. The pixels 12 and 13 both operate in the normally white mode.

For stereoscopic operation, light passes through the SLM 4 in the opposite direction. Randomly polarised input light is polarised by the polariser 35 and analyzed by the polariser 22. The plates 44 and 45 convert the output light to right-handed and left-handed circularly polarised light, respectively, which may-then be analyzed by suitable analysing glasses.

Figure 12:
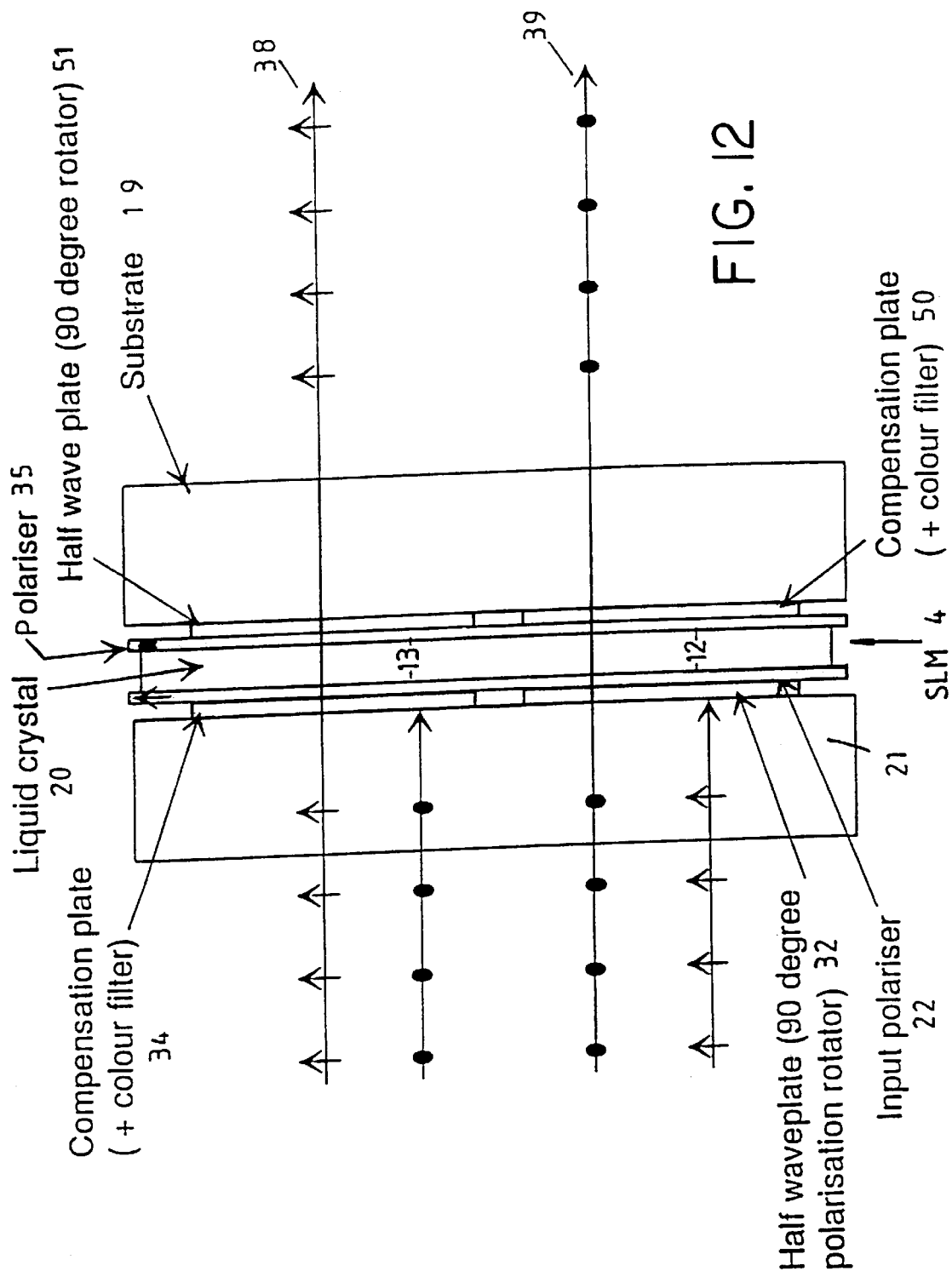

FIG. 12 shows an SLM 4 which differs from that shown in FIG. 9 in that the output polariser 35 is disposed next to the liquid crystal layer 20, a compensation plate 50 is disposed between the output polariser 35 and the substrate 19 for the pixel 12 and, for the pixel 13, a 90 degree rotator 51 is disposed between the output polariser 35 and the substrate 19.

For autostereoscopic operation as illustrated in FIG. 12, operation of the SLM differs from that of FIG. 9 in that the polarisation of light from the pixel 13 is rotated by 90 degrees. Thus, an observer sees the 3D image without requiring any viewing aids. However, because the left and right views have orthogonal directions of polarization, the observer may wear suitable analysing glasses in order to reduce residual cross talk in the autostereoscopic mode.

The SLM 4 of FIG. 12 may be used in a stereoscopic display with light passing in the same direction as during autostereoscopic operation. In fact, the SLM of FIG. 12 is symmetrical with respect to the direction of passage of light. Thus, the display may be switched between autostereoscopic and stereoscopic operation merely by changing between perpendicularly polarised light sources for autostereoscopic operation and a randomly polarised light source for stereoscopic operation.

In the SLM shown in FIG. 12, each of the pixels 12 and 13 has a compensation plate/rotator pair so that any performance degradations which occur in these components are balanced between the pixels 12 and 13. As in all of the SLMs described herein, appropriate colour filters may be provided substantially adjacent the liquid crystal pixels 12 and 13 so as to avoid parallax effects.

Figure 13:
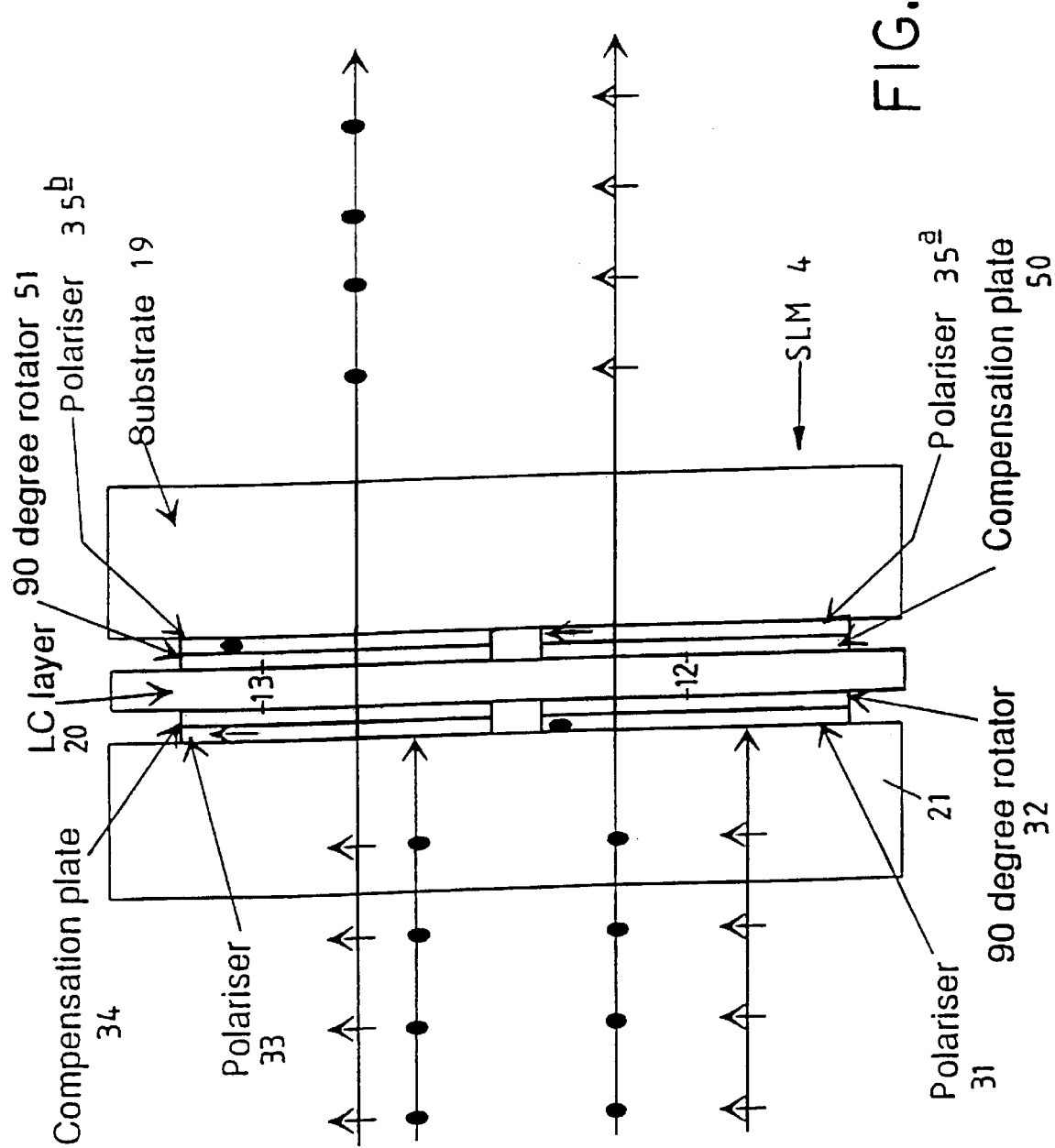

The SLM 4 shown in FIG. 13 differs from that shown in FIG. 12 in that the input and output polarisers 22 and 35 are omitted and are replaced by pixellated polarising layers adjacent the substrates 21 and 19. The pixel 12 is thus provided with an input polariser 31 and an output polariser 35a whereas the pixel 13 is provided with an input polariser 33 and an output polariser 35b. The SLM of FIG. 13 may be used in the same way as the SLM of FIG. 12 for stereoscopic and autostereoscopic operation and, with suitable analysing glasses, for reduced cross talk autostereoscopic operation.

Figure 14:
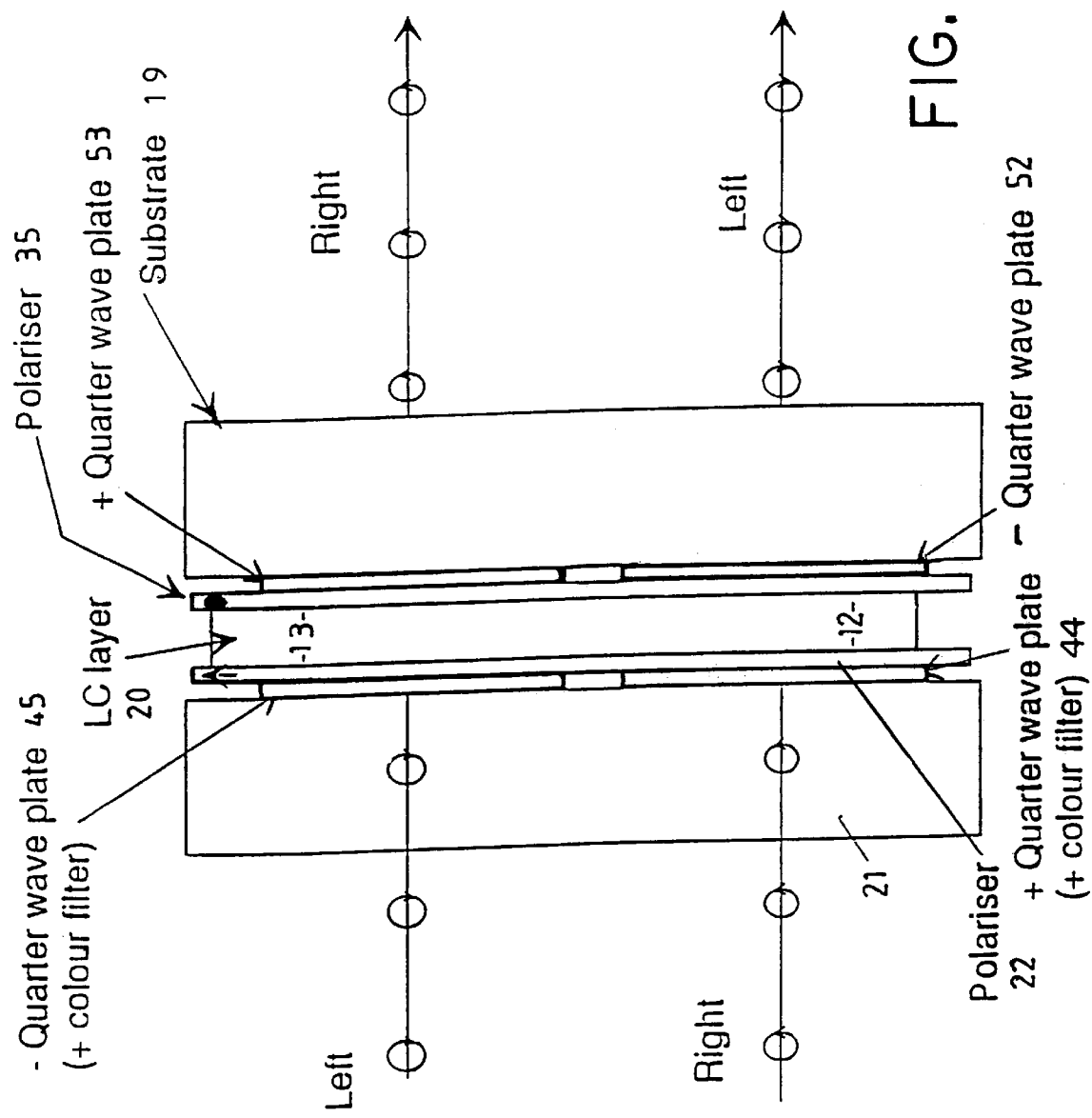

FIG. 14 illustrates an SLM 4 which differs from that shown in FIG. 11 in that the output polariser 35 is disposed adjacent the liquid crystal layer 20, the pixel 12 is provided with a −quarter waveplate 52, and the pixel 13 is provided with a +quarter waveplate 53.

For autostereoscopic operation, the SLM of FIG. 14 is illuminated by polarised light sources such as the sources 46 and 47 shown in FIG. 11. The output light from the pixels 12 and 13 is analyzed by the output polariser 35 and then converted to circular polarisation of opposite handedness by the plates 52 and 53. The observer can view the 3D image autostereoscopically without any viewing aids or may wear suitable analysing glasses so as to improve the cross talk performance.

For stereoscopic operation, randomly polarised light is polarised by the input polariser 22 and analyzed by the output polariser 35. The output light is then converted to circularly polarised light of opposite handedness and the 3D image can be viewed by an observer wearing suitable analysing glasses.

The structure of the SLM shown in FIG. 14 is symmetrical with respect to the direction of light passing therethrough. Accordingly, changing between stereoscopic and autostereoscopic operation may be achieved by changing between polarised and unpolarised light sources.

Figure 15:
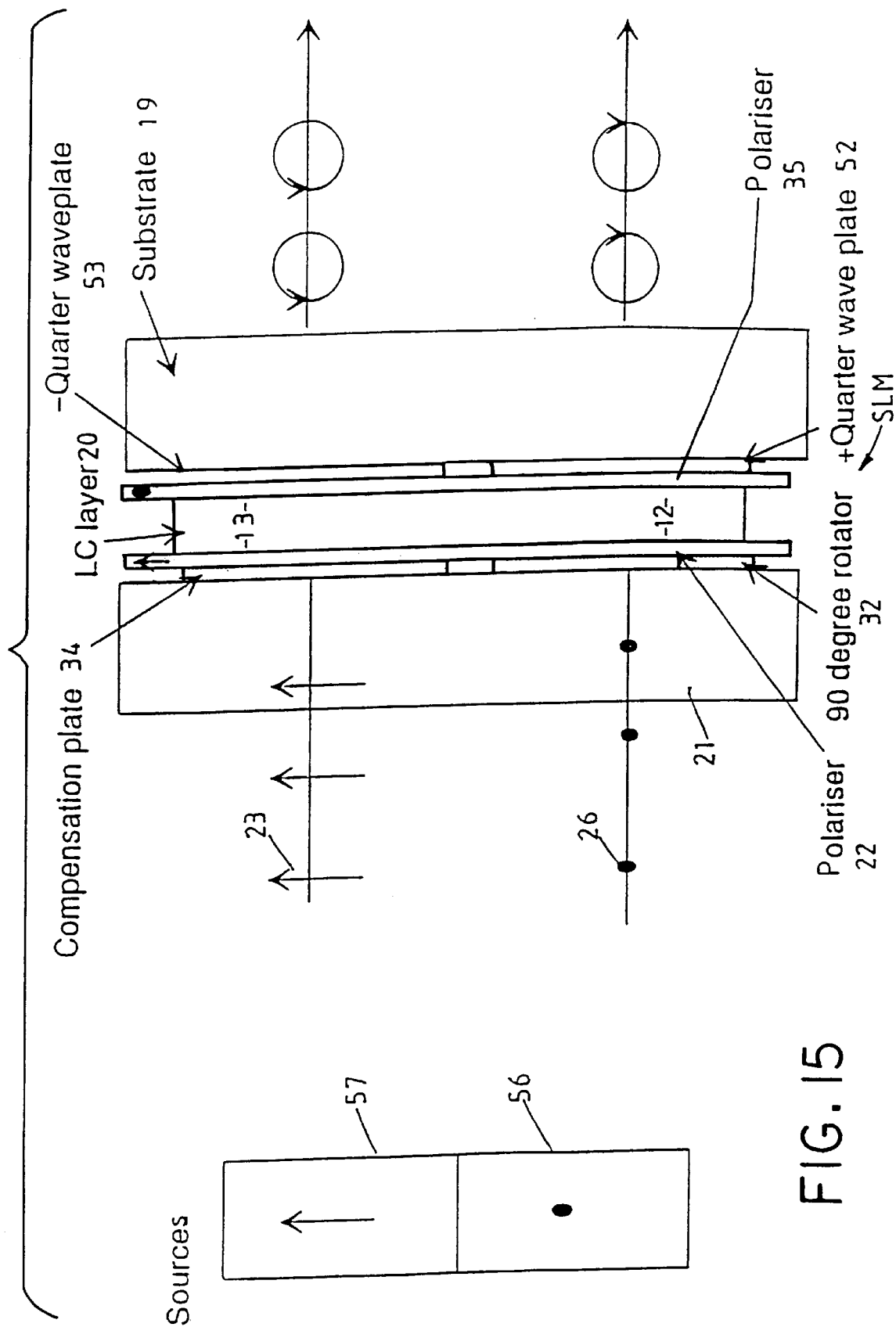

The SLM 4 shown in FIG. 15 differs from that shown in FIG. 14 in that the +and −quarter waveplates 44 and 45 are replaced by a 90 degree rotator 32 and a compensation plate 34, respectively. For autostereoscopic operation, linearly polarised light sources 56 and 57 having orthogonal polarisation directions are used in place of the circularly polarised light sources 46 and 47 of FIG. 11. The input polariser 22 passes light having the polarisation 23 from the source 57 while blocking light having the polarisation 26 from the source 56. The combination of the rotator 32 and the input polariser 22 passes light having the polarisation 26 from the source 56 while blocking light having the polarisation 23 from the source 57. The output polariser 35 analyses grey scale from the pixels 12 and 13 and the waveplates 52 and 53 convert the output light from the pixels 12 and 13 to circularly polarised light of opposite handedness. The observer sees the 3D image without having to wear viewing aids or may wear suitable analysing glasses so as to reduce residual cross talk.

For stereoscopic operation, the light sources 56 and 57 are replaced by a randomly polarised Lambertian light source. Light from the light source is polarised by the polariser 22, analyzed by the polariser 35, and converted by the waveplates 52 and 53 to circularly polarised light of opposite handedness. The observer wears suitable analysing glasses in order to see the 3D image. As previously described, the use of circularly polarised output light means that the cross talk performance is not affected by tilting of the head of the observer.

Figure 16:
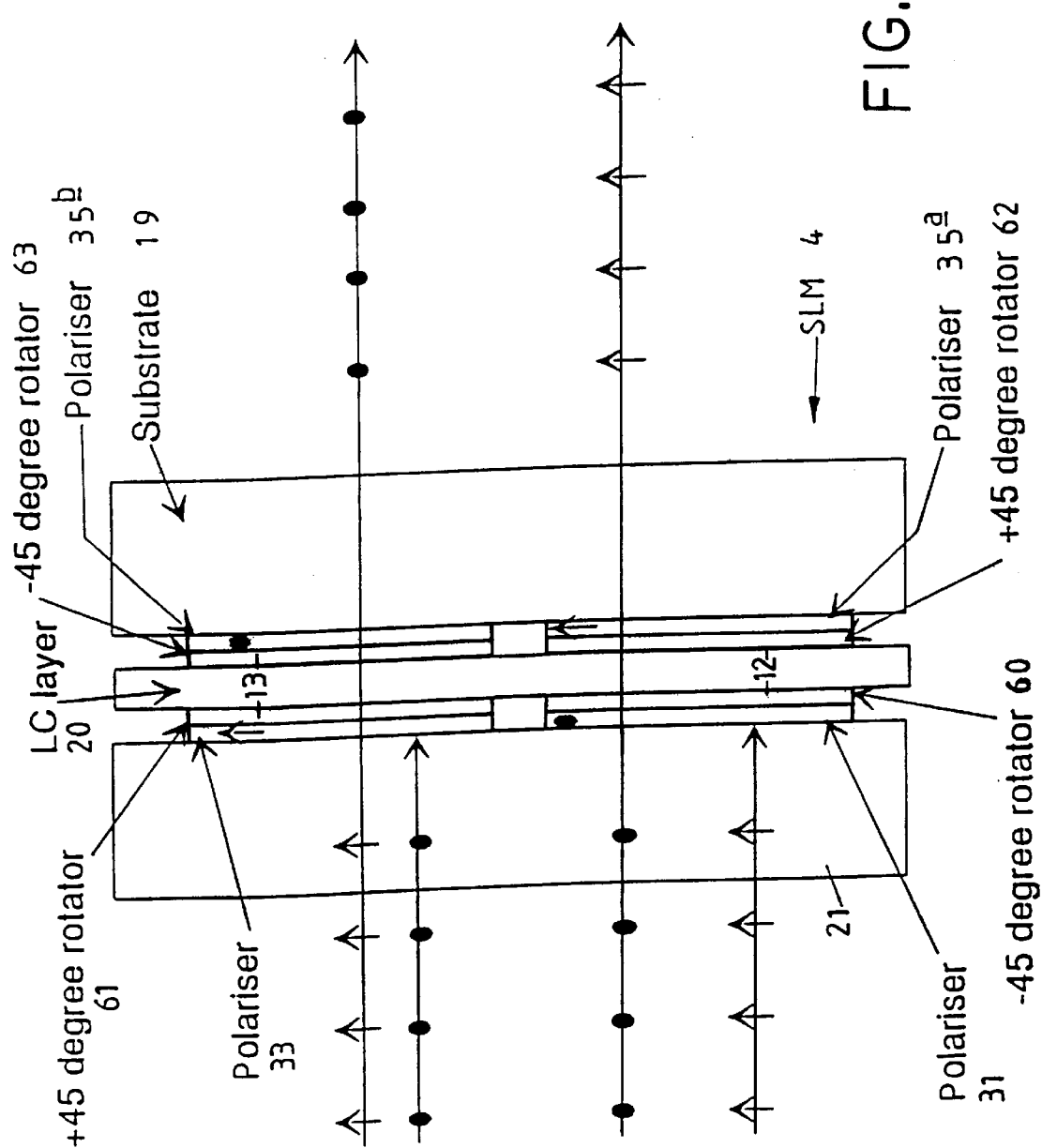

The SLM 4 shown in FIG. 16 differs from that shown in FIG. 13 in that the 90 degree rotator 32 is replaced by a −45 degree rotator 60, the compensation plate 34 is replaced by a +45 degree rotator 61, the compensation plate 50 is replaced by a +45 degree rotator 62 and the 90 degree rotator 51 is replaced by a −45 degree rotator 63.

For autostereoscopic operation, linearly polarised light sources such as those shown in FIG. 15 are used. The input polarisers 31 and 33 pass light of orthogonal linear polarisations and the rotators 60 and 61 rotate the polarisations so that the light applied to the liquid crystal layer of the pixels 12 and 13 is of the same linear polarisation. The combinations of the output polarisers 35*a* and 35*b* and the rotators 62 and 63 analyze light of the same polarisation from the liquid crystal layer 20 for the pixels 12 and 13 and provide output light from the pixels of orthogonal linear polarisations. The 3D image can be viewed without viewing aids or via suitable analysing glasses for reducing residual cross talk. For stereoscopic operation, randomly polarised light is polarised by the input polarisers 31 and 33 and the orthogonally polarised output light is analyzed by suitable analysing glasses.

The arrangement of FIG. 16 may be advantageous because of the use of balanced rotators at each polarisation stage. Any viewing angle differences of the rotators are effectively reduced by the use of matched pairs of rotators for each of the pixels 12 and 13.

Figure 17:
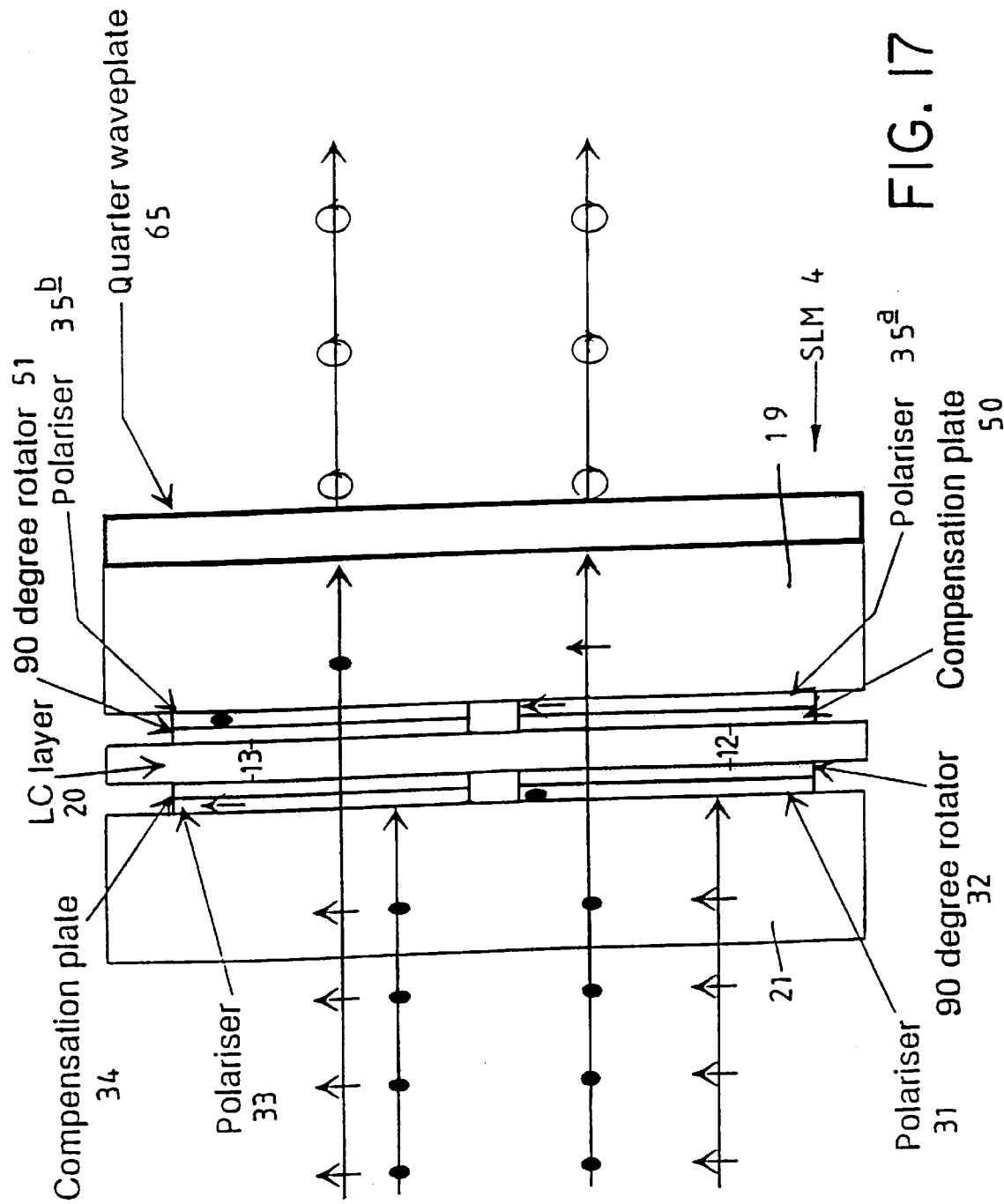

The SLM 4 shown in FIG. 17 differs from that shown in FIG. 13 in that an output broadband quarter waveplate 65 is disposed on the external surface of the substrate 19. Operation of the SLM of FIG. 17 differs in that the orthogonal linear output polarisations of the SLM shown in FIG. 13 are converted to orthogonal circular polarisations. Similarly, a broad band quarter waveplate may be placed on the external surface of the substrate 21 for use with circularly polarised light sources for autostereoscopic operation.

Figure 18:
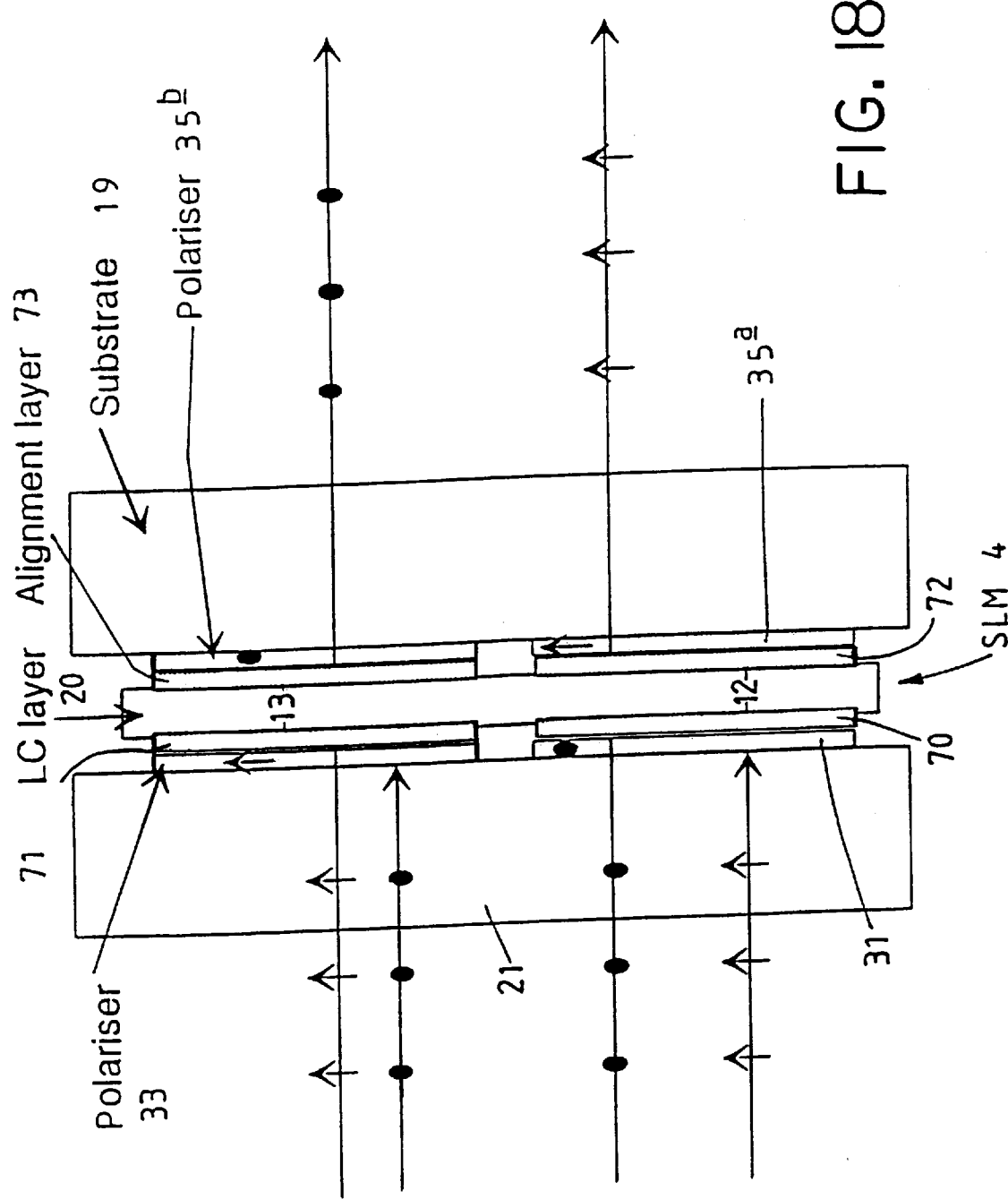

Although not explicitly shown in the embodiments described hereinbefore, it is implicit that alignment layers for the liquid crystal of the layer 20 are uniform throughout the extent of the layer. However, this is not essential. For example, FIG. 18 shows a spatial light modulator 4 of the type shown in FIG. 8 in which alignment layers 70 to 73 for the pixels 12 and 13 are explicitly shown. In this embodiment, the alignment layers have alignment directions which are different for the pixels 12 and 13. Thus, the alignment layer 70 has an alignment direction which is parallel to the absorbing axis of the polariser 31 whereas the alignment layer 71 of the pixel 13 has an alignment direction which is parallel to the absorbing axis of the polariser 33. Similarly, the alignment directions of the layers 72 and 73 are parallel to the absorbing axes of the polarisers 35*a* and 35*b*, respectively. Thus, the alignment directions of the layers 70 and 71 of the pixels 12 and 13 are perpendicular to each other. This arrangement improves the matching of the angular contrast performance of the pixels 12 and 13 compared to using a uniform alignment layer as shown in FIG. 8. The angular contrast in this arrangement is improved with respect to arrangements in which the alignment directions are perpendicular to the absorbing axes of the associated polarisers.

Figure 19:
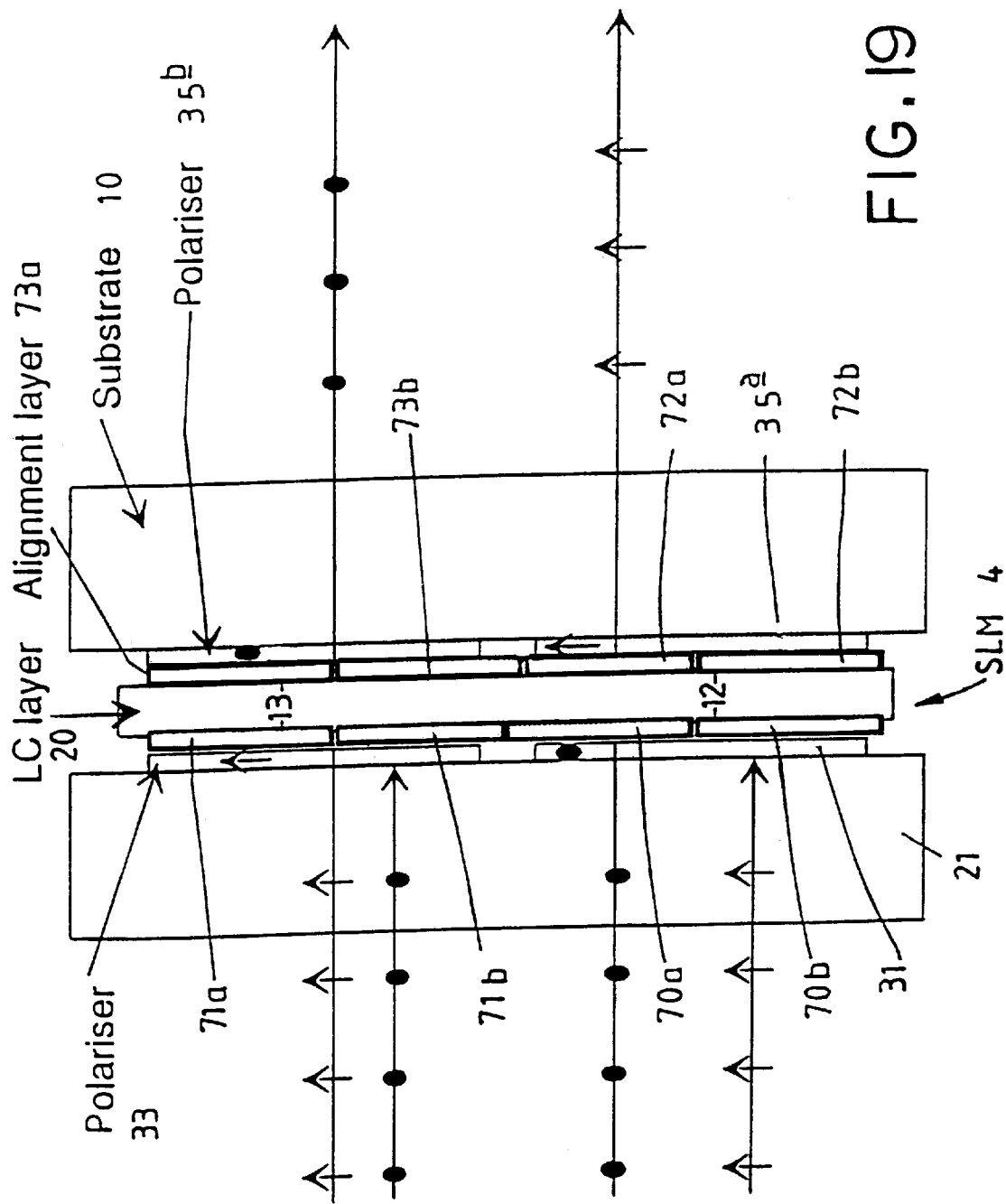

The SLM 4 shown in FIG. 19 differs from that shown in FIG. 18 in that a multi-domain liquid crystal alignment is provided within each of the pixels 12 and 13. In the arrangement shown by way of example in FIG. 19, each of the alignment layers is divided into two portions (indicated by subscripts a and b) having mutually perpendicular alignment directions. Such an arrangement has the effect of matching the angular viewing contrast performances of the pixels 12 and 13 by an averaging process. More complex domain structures within each pixel may also be used.

Figure 20:
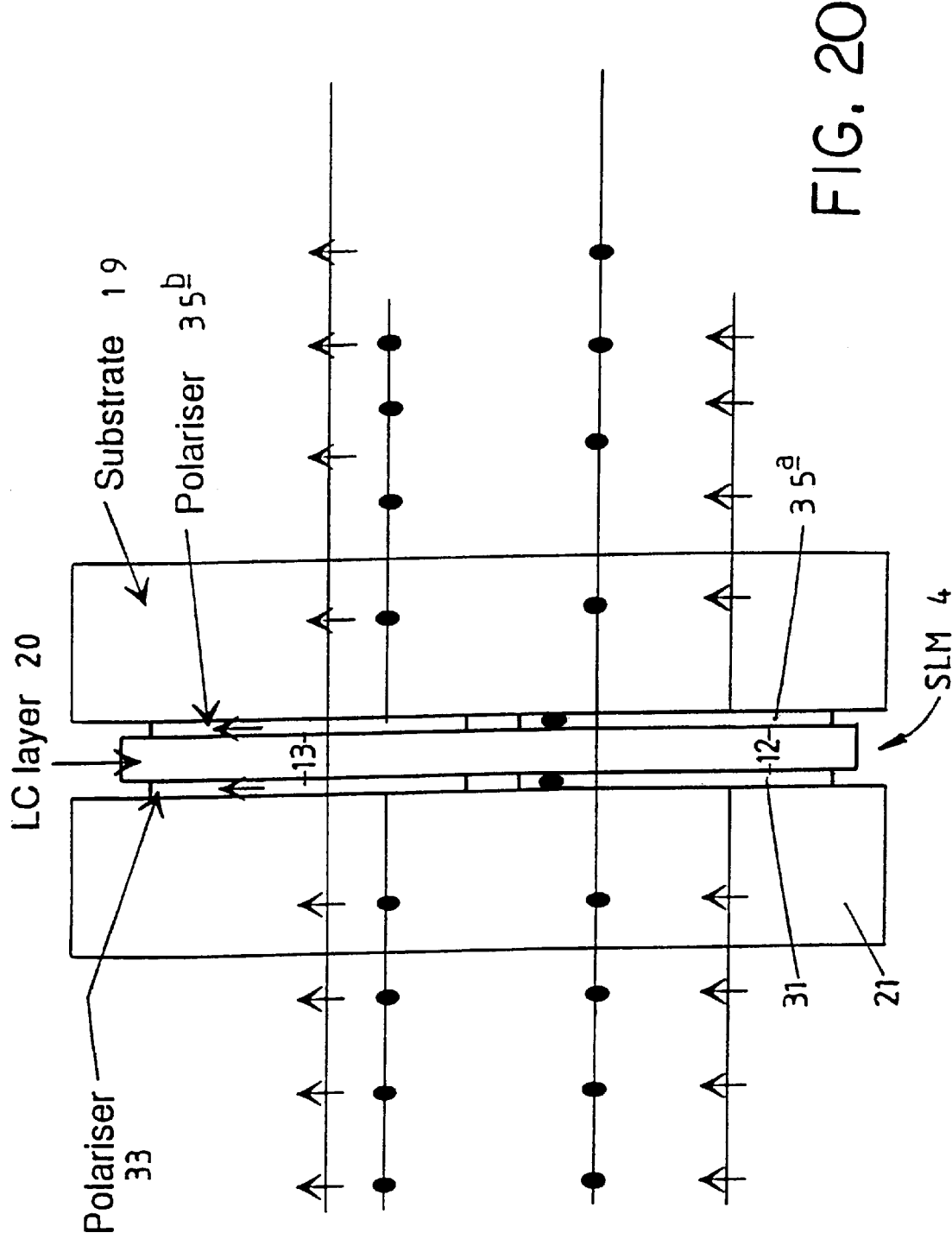

In all of the SLMs described hereinbefore, operation of all of the pixels 12 and 13 has been in the normally white mode. However, each of these SLMs may be operated in the normally black mode and FIG. 20 shows an SLM 4 of the type shown in FIG. 8 but modified for normally black operation. In particular, the polarisers 35*a* and 31 of the pixel 12 have parallel polarisation directions and the polarisers 35*b* and 33 of the pixel 13 have parallel polarisation directions when the TN-LC effect is used. The other embodiments may be modified similarly so that output polarisation from the liquid crystal layer is analyzed parallel to the input polarisation of light to the layer 20.

Similarly, optically active compensation plates may be provided in any of the embodiments, for instance so as to improve viewing range and angular contrast.

Although the SLMs disclosed hereinbefore have been implicitly described with respect to twisted nematic liquid crystal layers, SLMs may readily be provided which use super twisted nematic liquid crystals and variable birefringence liquid crystal techniques such as electrically controlled birefringence or $\pi$ cells. Further, complex compensation plates may be provided to match the birefringence for off-axis light passing through the different sets of pixels of the display. Such compensation plates may include a negative retardance component and may include guiding components of appropriate handedness of twist to improve and/or match the angular viewing contrast.

Figure 21:
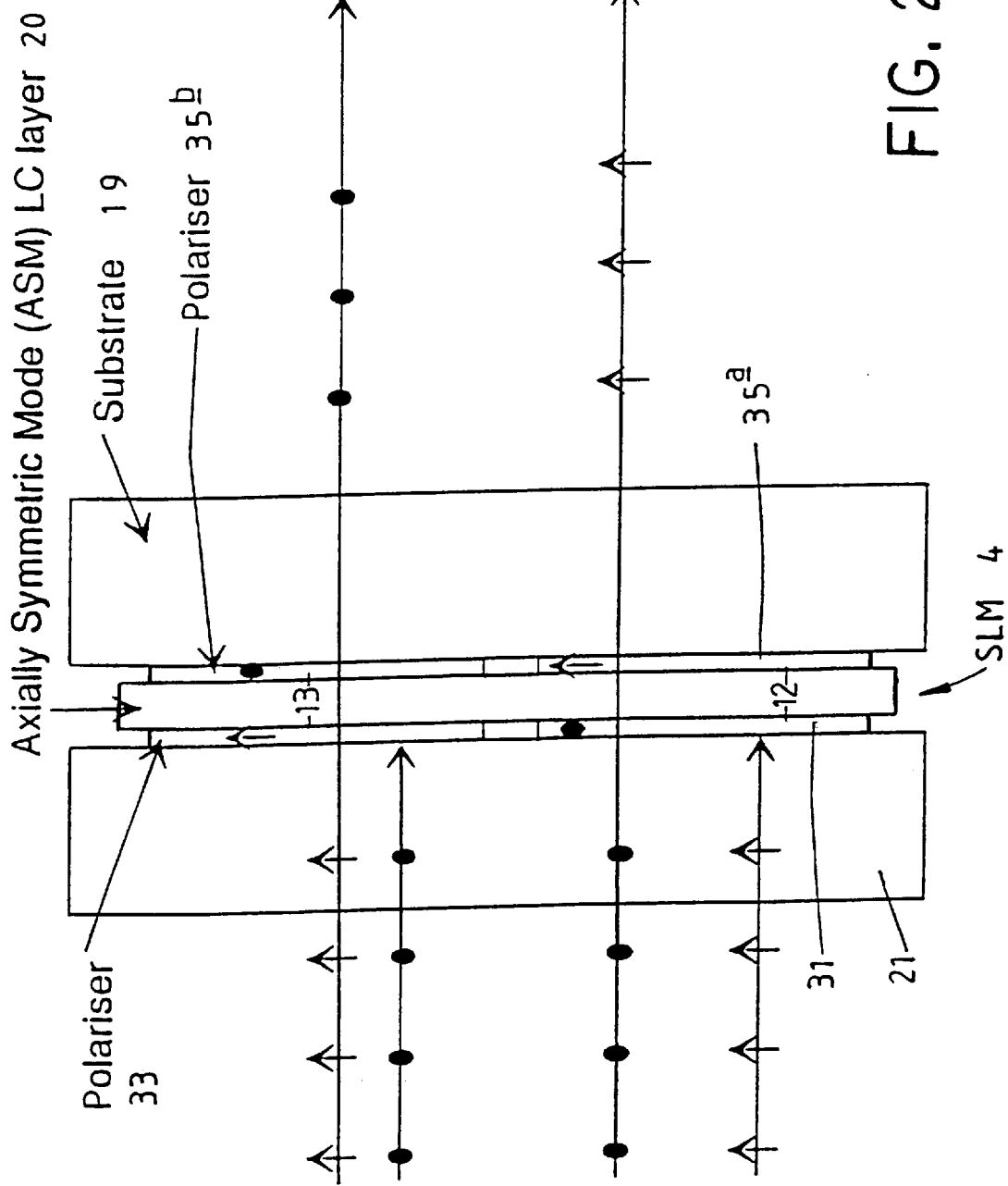

FIG. 21 illustrates an SLM 4 which differs from that shown in FIG. 8 in that the liquid crystal layer 20 is operated in the axially symmetric mode, for instance as described by N. Yamada et al, "Axially Symmetric Mode", SID95 Digest. In particular, the axially symmetric mode (ASM) establishes a radial or coaxially oriented liquid crystal alignment which is different from the linear alignment of the standard TN-LC effect. In particular, it is possible to achieve this ASM alignment without the polyimide alignment layer, which requires high temperature processing.

Image inversion (sometimes called contrast inversion) can occur when conventional displays are viewed substantially off-axis. When compared with the relative lightness on-axis, the same grey levels can have the opposite relative lightness off-axis because of the effect of the birefringence of the liquid crystal. Thus, parts of the image appear like in a photographic negative or contrast inverted image. The polarisers are set to give matched angular viewing contrast and to preserve the excellent angular viewing properties of the axially symmetric mode. Further compensation plates (not shown) may be added to preserve the exceptionally wide viewing angle and freedom from "image inversion" properties inherent in the axially symmetric mode and/or to improve the matching of the off-axis contrast performances of the pixels 12 and 13.

As is well known, polarisers can be damaged by ultraviolet light and usually include an ultraviolet protecting film. With appropriately shaped micropolariser patterns, this film may be used to form all or part of an ultraviolet exposure mask, for instance for use in the fabrication of an axially symmetric mode SLM. In addition, the ultraviolet shielding and polarising properties of the micropolariser have to be considered in order to allow the formation of polymer walls around each pixel.

The axially symmetric mode may be used in other embodiments, in particular in autostereoscopic and stereoscopic displays with the SLM of FIGS. 9 and 11 and in stereoscopic displays with the SLM of FIG. 10.

A transparent conductor electrode for applying a field to the liquid crystal layer may be located between the optical components and the substrate or between the optical components and the liquid crystal layer. In the former case, the effect of the additional dielectric layers in series with the liquid crystal layer has to be taken into account, for instance on the required drive voltage from an active matrix element.

Figure 22:
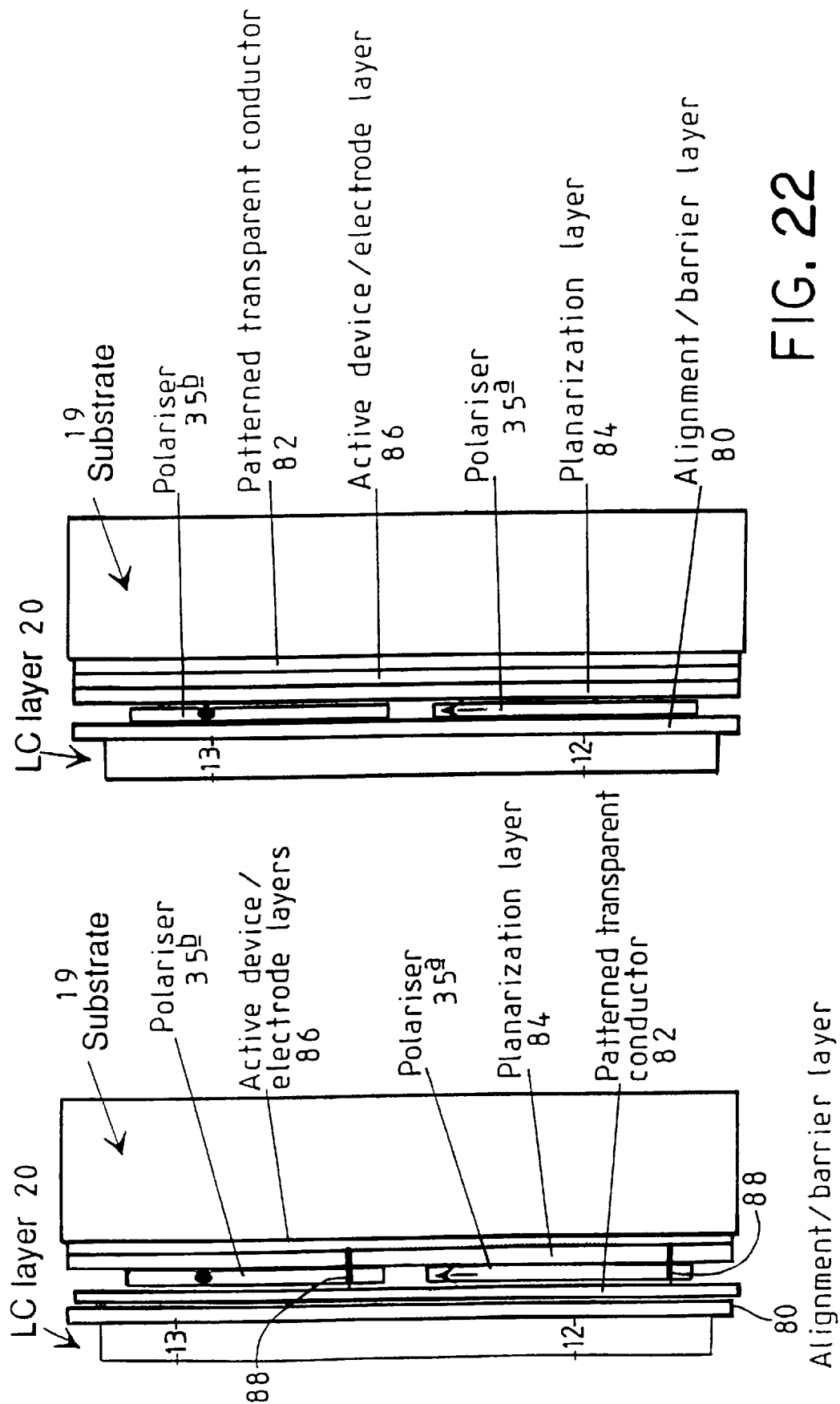

The left part of FIG. 22 illustrates an arrangement in which an (optional) alignment/barrier layer 80 is disposed between the liquid crystal layer 20 and a patterned transparent conductor 82. This arrangement is of the type comprising polarisers 35a and 35b which are disposed between the conductor 82 and a planarisation layer 84. At least one (optional) active device/electrode layer 86 is formed on the substrate 19 and is overlayed by the planarisation layer 84. The conductor 84 is thus disposed between the optical components 35a, 35b and the liquid crystal layer 20 but is separated from the active drive/electrode layer or layers 86. Accordingly, suitable through connections 88 are provided between the conductor 82 and the layer or layers 86.

The right part of FIG. 22 illustrates an arrangement which differs from that shown in the left part of FIG. 22 in the order of layers between the liquid crystal layer 20 and the substrate 19. Thus, the patterned transparent conductor 82 is disposed on the substrate 19 and is overlayed by the active device/electrode layer 86, which in turn is provided with the planarisation layer 84. The conductor 82 is thus connected directly to the layer 86 and does not require the through connections 88. However, because the optical components 35a, 35b and the layers 84 and 86 are disposed between the conductor 82 and the liquid crystal layer 20, the drive voltage may have to be increased for correct operation of the display.

In the event that displays using SLMs of the type disclosed herein are required not only to provide 3D images but also 2D images, the 2D image will have the full resolution of the SLM. This is advantageous compared with autostereoscopic 3D displays of the lenticular or parallax barrier type, in which the 2D display resolution is a fraction of the SLM resolution.

In SLMs required to provide a colour display, as mentioned hereinbefore, colour filters may be incorporated near the liquid crystal layer so as to minimise parallax effects. Wavelength dependent components such as quarter waveplates, 90 degree rotators, and 45 degree rotators may then be tuned to the colour filter associated with each pixel of the display.

In the SLMs described hereinbefore, the rotation functions may be provided by birefringence or guiding or a combination of the two. Both the rotation and the compensation elements may also be composite devices formed from more than one layer in order to increase the optical band width of the devices or to improve further the range/matching of angular viewing cones of the groups of pixels.

The SLMs described hereinbefore all include optical elements which have to be incorporated within the LCD itself. The materials of which these elements are made must therefore be capable of enduring the processing temperature and environment associated with LCD fabrication without significant degradation. As is well known, some though not all LCDs use alignment layers to promote or stabilise the liquid crystal orientation. Some known types of alignment layer require processing at temperatures in the vicinity of 200° C. The materials of the optical elements should endure the liquid crystal processing environment without substantial degradation.

Although not limited to active matrix displays, this important class of display introduces some additional fabrication issues compared with passive matrix displays. In particular, the additional components must not introduce unacceptable contamination into the liquid crystal material which might affect important properties, such as the holding ratio. Barrier layers may therefore be used to help protect the liquid crystal material from degradation.

Further, the processing temperature of an active matrix substrate can be higher than that of a counter electrode substrate. Thus, it may be advantageous to adopt structures described hereinbefore where the external components such as the polarisers may be disposed on the outside of the active matrix substrate rather than the counter electrode substrate.

In the embodiments described hereinbefore, polarisation has been performed by polarisers which are distinct from the liquid crystal layers. However, it is possible to omit some of the polarisers by using guest-host layers in which a dye or dyes with anisotropic absorption characteristics are mixed with the liquid crystal. For instance, in one type of guest-host system, alignment layers having parallel alignment directions cause the liquid crystals to align parallel to each other in the absence of an applied field. The anisotropic dye molecules align with the liquid crystal molecules so that the layer acts as a linear polariser. When a field is applied across the layer, the parallel alignment of molecules is disrupted and the layer transmits light with little or no polarisation.

In the case of embodiments, such as that shown in FIG. 9, having a polariser common to all pixels, the polariser 22 or 35 may be omitted and, for instance, a dye or dyes with anisotropic absorption characteristics may be added to the liquid crystal layer 20. In the case of embodiments, such as that shown in FIG. 8, in which the pixels 12 and 13 are associated with polarisers having orthogonal polarisation directions, the polarisers on one side of the layer 20 may be omitted and the alignment layers of the pixels 12 and 13 may have orthogonal alignment directions so that the pixels 12 and 13 act as orthogonal polarisers. Such arrangements avoid possible manufacturing difficulties involved with SLMs having distinct polarisers as described hereinbefore.

In various of the SLMs described hereinbefore, specific values of angular rotation of the polarisation vectors have been described. However, it is the relative rotations between the two groups of pixels which are important. For instance, rotations of −30° and +60° are equivalent to rotations of 0° and 90° as are rotations of 90° and 180°.

Figure 23:
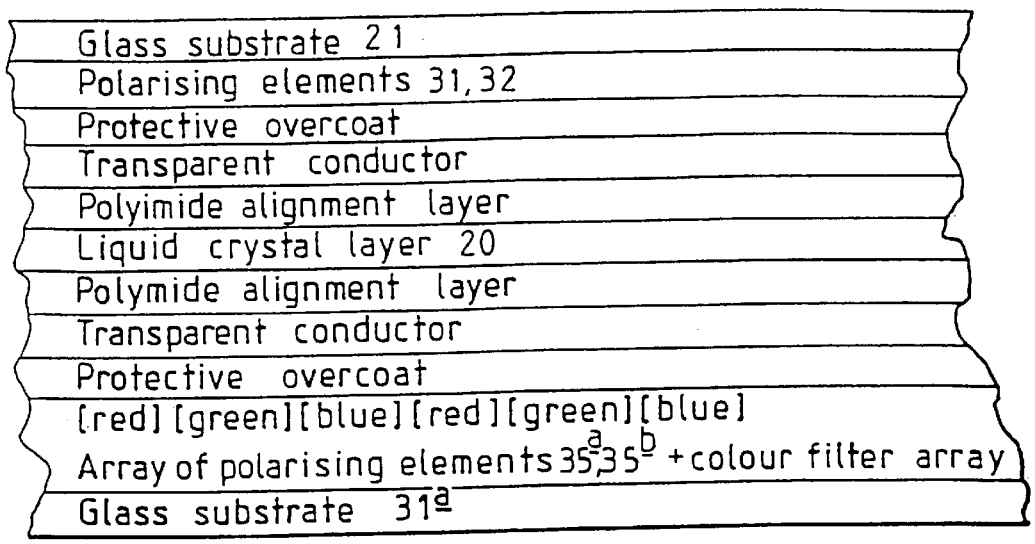
FIG. 23 is another diagrammatic view of the SLM of FIG. 8.

FIG. 23 shows another possible configuration of the polarizing elements of a liquid crystal display. As illustrated, the polarization adjusting elements may be incorporated with the colour filters in a single layer.

In each of the described embodiments, the SLM includes a liquid crystal layer for modulating the light incident thereon. Other transmissive spatial light modulators may be used.

Figure 24:
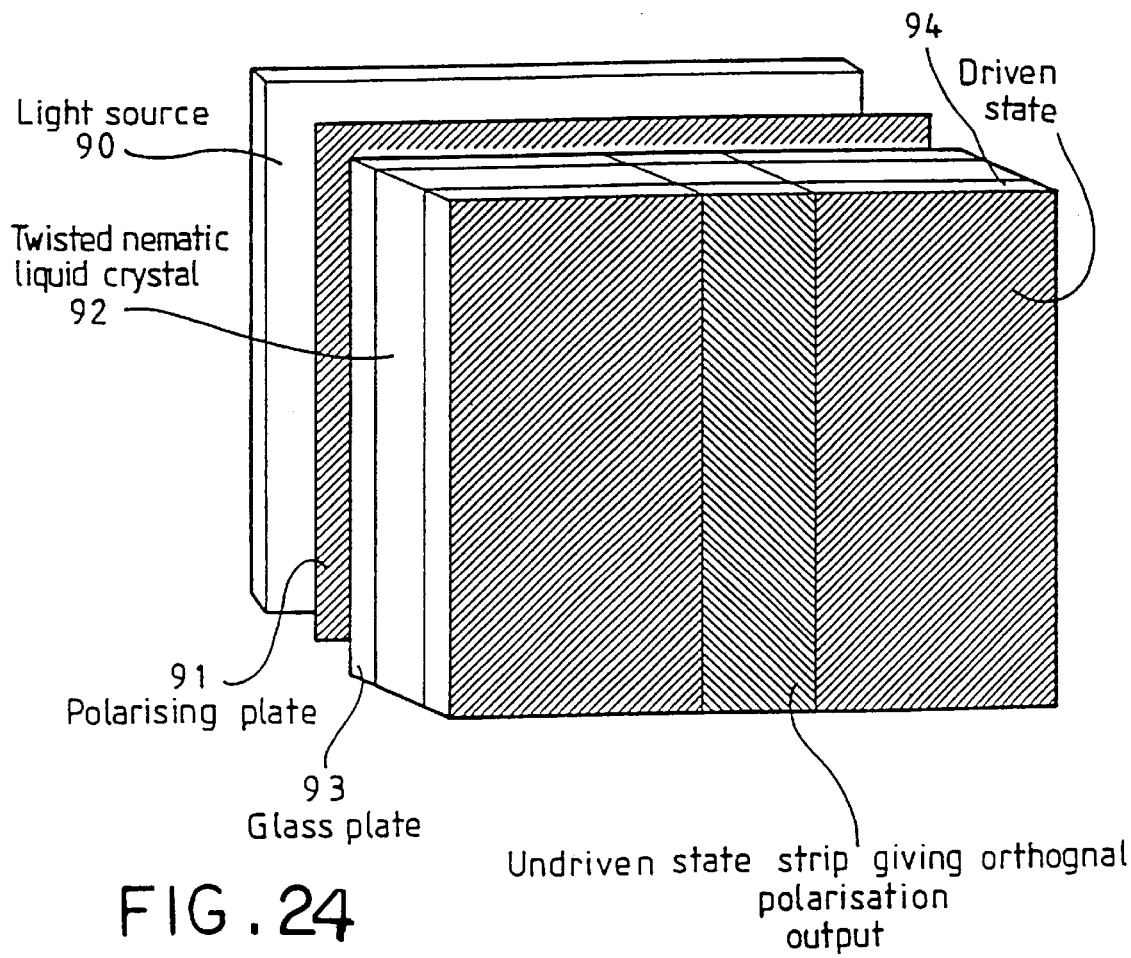
FIG. 24 is a view illustrating a programmable light source suitable for use with the display device of FIG. 1.

FIG. 24 shows a programmable plane polarized light source suitable for use in the display devices of FIGS. 1 to 6. The polarized light source comprises a source 90 of non-polarized light arranged to transmit light towards a polarizing plate 91. The polarizing plate 91 is substantially transparent to plane polarized light of a first polarization and substantially opaque to plane polarized light having a polarization axis perpendicular to the first polarization. Light from the polarizing plate 91 is incident upon a liquid crystal device which comprises a first glass substrate 93 carrying a first electrode and alignment layer, a liquid crystal layer 92 and a second glass substrate 94 carrying a second electrode and alignment layer. The liquid crystal layer 92 may comprise a layer of TN or ferroelectric liquid crystal material or may form a pi-cell.

Operation of the light source using a TN layer will now be described. In use, the electrodes are used to switch the liquid crystal layer 92 between its fully driven state and its fully undriven state. In its driven state, the plane polarized light transmitted by the polarizing plate 91 passes through the liquid crystal layer 92 without having its axis of polarization altered by the liquid crystal material in the undriven state, the axis of polarization of the light passing through the liquid crystal layer 92 is rotated by 90°, the transmitted light having a polarization axis perpendicular to the light incident on the liquid crystal device.

By controlling the liquid crystal device using a suitable controller (not shown), the device can be used to produce two sources of polarized light, the polarization axes of which are perpendicular to one another. When used in a display device in which it is desirable to track the observer, the effective positions of the polarized light sources can be changed without physically moving the light source by switching regions of the liquid crystal material between its fully driven and fully undriven states.

Where the SLM is of the type in which the output polarisations are orthogonal, for example the-SLMs illustrated in FIGS. 8 and 12 to 21, by switching from directional polarized light sources to a Lambertian source, for instance arranged to emit light of random polarization or light polarized at an angle, preferably 45°, to both the first and second polarization, the image can be viewed from a large number of locations provided viewing aids, for example spectacles having polarized lenses of cross polarization, are used. Thus, a switchable display capable of displaying autostereoscopic images visible from a relatively small range of viewing positions or stereoscopic images visible from a relatively large range of viewing positions is possible. For SLMs of the type in which the output polarisations is the same for all pixels, the SLM may be rotated so that light passes in the opposite direction for stereoscopic viewing.

When the display is being used by one observer or only a small number of observers, it may be appropriate to operate the display autostereoscopically. However, when the larger number of observers wish to view the display simultaneously, the display maybe operated stereoscopically with the observer wearing polarisation analysing glasses.

Various modifications may be made within the scope of the invention. For instance, the polarised light sources and optical systems described hereinbefore may be replaced by an illumination system using holographic elements. In such an arrangement, each holographic element may be aligned with a respective micro polarising element polarised in either of two orthogonal polarisations and disposed on the input or output side of a hologram constituting the holographic elements. When appropriately illuminated with the correct reconstruction beam, each holographic element produces a defined viewing window for a certain colour. The holograms may be recorded so that each holographic element produces several viewing lobes with the holograms being arranged in groups so that the light from each group of pixels is imaged to one group of windows with the same polarisation. An advantage of such holographic techniques is that improvements in the off-axis behaviour of the display may be obtained because off-axis aberrations can be largely cancelled when recording the holograms.

Suitable holograms may be made in photo polymer, dichromated gelatin, as an etched surface relief hologram, or as an embossed hologram. The holograms may be computer-generated or may be recorded by interfering light from an illuminated viewing window with a reference beam and repeating this for each of red, green, and blue light.

Such holograms may be laser illuminated. Alternatively, a collimated white light backlight may be used to illuminate such holograms. In one example, such a backlight may comprise a lens array disposed on the surface of a slit array with barriers disposed between adjacent lenses. Alternatively small glass spheres disposed on apertures in a surface maybe used. Thus, a relatively compact design of backlight may be provided. Alternatively, it may be possible to produce the required collimation by means of an edge-lit hologram.

It is also possible to operate the display as a reversionary high resolution two dimensional display. In this case, the spatial light modulator displays a single two dimensional image using all of the pixels. For this type of operation, backlight maybe switched from autostereoscopic operation to a Lambertian source, for instance using an element of the type shown in FIG. 24, so that the display may be seen from a wide range of viewing angles.

What is claimed is:

1. An autostereoscopic display comprising:
   an illumination source for producing light of a first polarization and light of a second polarization different from the first polarization;
   a spatial light modulator for modulating the light of the first polarization and the light of the second polarization from the illumination source; and
   an optical system for directing the light of the first polarization to a first viewing region and the light of the second polarization to a second viewing region,
   wherein the spatial light modulator includes:
      first polarization adjusting means for transmitting the light of the first polarization and substantially preventing transmission of the light of the second polarization;
      second polarization adjusting means for transmitting the light of the second polarization and substantially preventing transmission of the light of the first polarization; and
      first and second groups of picture elements optically aligned with the first and second polarization adjusting means, respectively.

2. An autostereoscopic display as claimed in claim 1, wherein the light of the first polarization is light polarized in a first direction and the light of the second polarization is light polarized in a second direction of polarization, the first direction being orthogonal to the second direction.

3. An autostereoscopic display as claimed in claim 1, wherein the first and second polarization adjusting means are disposed between a modulating layer of the spatial light modulator and the illumination source.

4. An autostereoscopic display as claimed in claim 1, wherein the optical system is disposed between the illumination source and the spatial light modulator.

5. An autostereoscopic display as claimed in claim 1, wherein the illumination source comprises at least one light source and a plurality of polarizers.

6. An autostereoscopic display as claimed in claim 1, wherein the picture elements of the first group alternate with the picture elements of the second group.

7. An autostereoscopic display as claimed in claim 1, further comprising a control circuit for controlling the first and second groups of picture elements to display first and second images, respectively, of a stereoscopic pair of images.

8. An autostereoscopic display as claimed in claim 1, wherein the illumination source comprises a single source of light and polarizing means for converting the light emitted therefrom to the light of the first polarization and the light of the second polarization.

9. An autostereoscopic display as claimed in claim 8, wherein the polarizing means comprises a polarizing sheet and a liquid crystal layer switchable between a state in which the polarization of light passing through the liquid crystal layer is rotated by 90 (2m) degrees where m is an integer, and a state in which the liquid crystal rotates the polarization axis by 90(2n+1) degrees where n is an integer.

10. An autostereoscopic display as claimed in claim 1, wherein the spatial light modulator comprises first and second substrates arranged to define therebetween a cell containing a liquid crystal layer; and wherein the spatial light modulator includes a plurality of picture elements which operate in the same mode and polarization adjusters which are provided for the respective picture elements and are disposed inside the cell, the picture elements being arranged as first and second sets, the polarization adjusters of the picture elements of the first set transmitting the light of the first polarization between the first substrate and the liquid crystal layer, the polarization adjusters of the picture elements of the second set transmitting the light of the second polarization between the first substrate and the liquid crystal layer.

11. An autostereoscopic display as claimed in claim 10, wherein the picture elements operate in the normally black mode.

12. An autostereoscopic display as claimed in claim 10, wherein the picture elements operate in the normally white mode.

13. An autostereoscopic display as claimed in claim 1, wherein the illumination source is switchable so as to provide unpolarized light or light having a single polarization which is transmitted by at least either one of the first polarization adjusting means and second polarization adjusting means.

14. An autostereoscopic display as claimed in claim 13, wherein the illumination system is switchable so as to function as a Lambertian source.

15. An autostereoscopic display as claimed in claim 13, further comprising a control circuit for controlling the first and second groups of picture elements to display a two dimensional image with the picture elements of the first and second groups displaying different picture elements of the two dimensional image.

16. An autostereoscopic display as claimed in claim 1, wherein the first group of picture elements outputs light of a third polarization and the second group of picture elements is outputs light of a fourth polarization different from the third polarization.

17. An autostereoscopic display as claimed in claim 16, wherein the third polarization and the fourth polarization are orthogonal.

18. An autostereoscopic display as claimed in claim 16, further comprising polarizing glasses having first and second polarizers for passing the light of the third polarization and the light of the fourth polarization, respectively.

19. An autostereoscopic display as claimed in claim 1, wherein the spatial light modulator is rotatable so as to reverse the direction of light passing therethrough for stereoscopic operation.

20. A spatial light modulator including first and second substrates defining therebetween a cell containing a liquid crystal layer, the modulator comprising a plurality of pixels which operate in the same mode and respectively including polarization adjusters disposed within the cell, the pixels being arranged as first and second sets, the polarization adjusters of the pixels of the first set transmitting light of a first polarization between the first substrate and the liquid crystal layer, the polarization adjusters of the pixels of the second set transmitting light of a second polarization which is different from the first polarization between the first substrate and the liquid crystal layer.

21. A modulator as claimed in claim 20, wherein the pixels of the first set are interleaved with the pixels of the second set.

22. A modulator as claimed in claim 20, wherein the second polarization is substantially orthogonal to the first polarization.

23. A modulator as claimed in claim 20, the first polarization and the second polarization are linear polarizations.

24. A modulator as claimed in claim 22, the first polarization and the second polarization are circular polarizations of opposite handedness.

25. A modulator as claimed in claim 20, wherein the pixels operate in the normally black mode.

26. A modulator as claimed in claim 20, wherein the pixels operate in the normally white mode.

27. A modulator as claimed in claim 20, wherein each of the polarization adjusters comprises an element which is distinct from the liquid crystal layer.

28. A modulator as claimed in claim 20, wherein the liquid crystal layer contains at least one anisotropic dye to form a guest-host layer constituting at least one of the polarization adjusters.

29. A modulator as claimed in claim 20, wherein each of the polarization adjusters of the pixels of the first set comprises a first linear polarizer having a first polarization direction, and each of the polarization adjuster of the pixels of the second set comprises a second linear polarizer having a second polarization direction substantially orthogonal to the first polarization direction.

30. A modulator as claimed in claim 29, wherein the pixels of the first set respectively comprise third linear polarizers having a third polarization direction disposed between the liquid crystal layer and the second substrate, and wherein pixels of the second set respectively comprise fourth linear polarizers having a fourth polarization direction substantially perpendicular to the third polarization direction disposed between the liquid crystal layer and the second substrate.

31. A modulator as claimed in claim 29, wherein first rotation adjusters are provided for the respective pixels and are disposed between the liquid crystal layer and the second substrate; the polarization rotations of the first rotation adjusters of the pixels of the first and second sets differ by substantially 90 degrees; and a fifth linear polarizer is arranged to pass light having a fifth polarization direction passing through the second substrate.

32. A modulator as claimed in claim 20, wherein each of the polarization adjusters of the pixels of the first set comprises a first linear polarizer having a first polarization direction and a first rotation adjuster; each of the polarization adjusters of the pixels of the second set comprises a second linear polarizer having a second polarization direction substantially perpendicular to the first polarization direction and a second rotation adjuster; and the first and second rotation adjusters are disposed between the liquid crystal layer and the first and second polarizers, respectively, and provide polarization rotations which differ by substantially 90 degrees.

33. A modulator as claimed in claim 32, further comprising a fifth linear polarizer arranged to pass light having a fifth polarization direction passing through the second substrate.

34. A modulator as claimed in claim 32, wherein each of the pixels of the first set comprises a third linear polarizer having a third polarization direction disposed between the liquid crystal layer and the second substrate; each of the pixels of the second set comprises a fourth linear polarizer having a fourth polarization direction substantially perpendicular to the third polarization direction disposed between the liquid crystal layer and the second substrate; and each of the pixels includes a third rotation adjuster disposed between the liquid crystal layer and the third and fourth linear polarizers, the polarization rotation of the third rotation adjuster of each of the pixels of the first set differing from the polarization rotation of the third rotation adjuster of each of the pixels of the second set by substantially 90 degrees.

35. A modulator as claimed in claim 20, wherein the polarization adjusters of the pixels of the first and second sets comprise second and third rotation adjusters, respectively, providing rotations which differ by substantially 90 degrees and a sixth linear polarizer disposed between the liquid crystal layer and the second and third rotation adjusters.

36. A modulator as claimed in claim 20, wherein the polarization adjusters of the pixels of the first and second sets comprise first positive and negative quaterwave plates, respectively, and a sixth linear polarizer disposed between the liquid crystal layer and the first positive and negative quarterwave plates.

37. A modulator as claimed in claim 35, further comprising a fifth linear polarizer arranged to pass light having a fifth polarization direction passing through the second substrate.

38. A modulator as claimed in claim 36, further comprising a fifth linear polarizer arranged to pass light having a fifth polarization direction passing through the second substrate.

39. A modulator as claimed in claim 35, wherein the pixels respectively include first rotation adjusters disposed between the liquid crystal layer and the second substrate; a polarization rotation of the first rotation adjusters of the pixels of the first set differs from that of the pixels of the second set by substantially 90 degrees; and a fifth linear polarizer is disposed between the liquid crystal layer and the first rotation adjusters.

40. A modulator as claimed in claim 36, wherein the pixels respectively include first rotation adjusters disposed between the liquid crystal layer and the second substrate; a polarization rotation of the first rotation adjusters of the pixels of the first set differs from that of the pixels of the second set by substantially 90 degrees; and a fifth linear polarizer is disposed between the liquid crystal layer and the first rotation adjusters.

41. A modulator as claimed in claim 35, further comprising: second positive and negative quarterwave plates disposed between the liquid crystal layer and the second substrate; and a fifth linear polarizer disposed between the liquid crystal layer and the second positive and negative quarterwave plates.

42. A modulator as claimed in claim 36, further comprising: second positive and negative quarterwave plates disposed between the liquid crystal layer and the second substrate; and a fifth linear polarizer disposed between the liquid crystal layer and the second positive and negative quarterwave plates.

43. A modulator as claimed in claim 20, further comprising a quarterwave plate for passing light passing through the second substrate.

44. A modulator as claimed in claim 29, wherein each of the pixels of the first set comprises a first alignment layer disposed between the first linear polarizer and the liquid crystal layer and having an alignment direction substantially perpendicular to the first polarization direction, and wherein each of the pixels of the second set comprises a second alignment layer disposed between the second linear polarizer and the liquid crystal layer and having an alignment direction substantially perpendicular to the second polarization direction.

45. A modulator as claimed in claim 32, wherein each of the pixels of the first set comprises a first alignment layer disposed between the first linear polarizer and the liquid crystal layer and having an alignment direction substantially perpendicular to the first polarization direction, and wherein each of the pixels of the second set comprises a second alignment layer disposed between the second linear polarizer and the liquid crystal layer and having an alignment direction substantially perpendicular to the second polarization direction.

46. A modulator as claimed in claim 35, wherein each of the pixels of the first set comprises a first alignment layer disposed between the first linear polarizer and the liquid crystal layer and having an alignment direction substantially perpendicular to the first polarization direction, and wherein each of the pixels of the second set comprises a second alignment layer disposed between the second linear polarizer and the liquid crystal layer and having an alignment direction substantially perpendicular to the second polarization direction.

47. A modulator as claimed in claim 36, wherein each of the pixels of the first set comprises a first alignment layer disposed between the first linear polarizer and the liquid crystal layer and having an alignment direction substantially perpendicular to the first polarization direction, and wherein each of the pixels of the second set comprises a second alignment layer disposed between the second linear polarizer and the liquid crystal layer and having an alignment direction substantially perpendicular to the second polarization direction.

48. A modulator as claimed in claim 20, wherein each of the pixels comprises an alignment layer which is disposed between the polarization adjuster and the liquid crystal layer and has a plurality of regions of different alignment directions.

49. A modulator as claimed in claim 48, wherein the alignment layer has first and second regions of substantially perpendicular alignment directions.

50. A modulator as claimed in claim 20, wherein the liquid crystal layer is arranged to have an axially symmetric alignment.

51. A spatial light modulator comprising: a liquid crystal layer; a substrate; a pixellated polarization adjusting layer disposed between the liquid crystal layer and the substrate, wherein the modulator includes a plurality of pixels operating in the same mode with a portion of the plurality of pixels belonging to a first set for providing light of a first polarization and another portion of the plurality of pixels belonging to a second set for providing light of a second polarization different from the first polarization.

* * * * *